United States Patent
Szaloky

(10) Patent No.: US 10,418,624 B2
(45) Date of Patent: Sep. 17, 2019

(54) CATHODE ARRANGEMENT, ENERGY CELL COMPRISING THE SAME, METHOD FOR MANUFACTURING THE CATHODE ARRANGEMENT, AND ARRANGEMENT FOR PROCESSING HYDROGEN GAS

(71) Applicant: SWES Technology Kft., Telki (HU)

(72) Inventor: Attila K Szaloky, Telki (HU)

( * ) Notice: Subject to any disclaimer, the term of this patent is extended or adjusted under 35 U.S.C. 154(b) by 89 days.

(21) Appl. No.: 15/521,010

(22) PCT Filed: Jan. 20, 2016

(86) PCT No.: PCT/HU2016/000006
§ 371 (c)(1),
(2) Date: Apr. 21, 2017

(87) PCT Pub. No.: WO2016/116772
PCT Pub. Date: Jun. 28, 2016

(65) Prior Publication Data
US 2018/0013134 A1  Jan. 11, 2018

(30) Foreign Application Priority Data

Jan. 21, 2015 (HU) .................................. 1500018
Nov. 16, 2015 (HU) .................................. 1500545

(51) Int. Cl.
| | |
|---|---|
| *H01M 4/133* | (2010.01) |
| *H01M 4/96* | (2006.01) |
| *H01M 8/0656* | (2016.01) |
| *H01M 14/00* | (2006.01) |
| *H01M 16/00* | (2006.01) |
| *H01M 4/34* | (2006.01) |
| *C25B 11/12* | (2006.01) |
| *C25B 1/04* | (2006.01) |
| *H01M 4/46* | (2006.01) |
| *C25B 9/00* | (2006.01) |
| *H01M 4/64* | (2006.01) |
| *H01M 4/75* | (2006.01) |
| *H01M 6/34* | (2006.01) |
| *H01M 4/86* | (2006.01) |

(52) U.S. Cl.
CPC ................ *H01M 4/34* (2013.01); *C25B 1/04* (2013.01); *C25B 9/00* (2013.01); *C25B 11/12* (2013.01); *H01M 4/46* (2013.01); *H01M 4/466* (2013.01); *H01M 4/64* (2013.01); *H01M 4/75* (2013.01); *H01M 4/96* (2013.01); *H01M 8/0656* (2013.01); *H01M 14/00* (2013.01); *H01M 16/003* (2013.01); *H01M 6/34* (2013.01); *H01M 2004/8689* (2013.01); *Y02E 60/366* (2013.01); *Y02P 70/56* (2015.11)

(58) Field of Classification Search
CPC .......... H01M 4/34; H01M 4/46; H01M 4/466; H01M 4/64; H01M 4/74; H01M 4/75; H01M 4/96; H01M 6/34; H01M 8/0656; H01M 16/03; H01M 2004/8689; C25B 1/04; C25B 9/00; C25B 11/02; C25B 11/12; Y02P 70/56; Y03E 60/366
USPC .......................................................... 429/119
See application file for complete search history.

(56) References Cited

U.S. PATENT DOCUMENTS

| | | | |
|---|---|---|---|
| 4,020,247 A | 4/1977 | Birt et al. | |
| 4,066,826 A | 1/1978 | Jones et al. | |
| 4,118,334 A * | 10/1978 | Goebel | H01M 4/06 252/182.1 |
| 4,822,698 A | 4/1989 | Jackovitz et al. | |
| 2007/0117021 A1 * | 5/2007 | Frustaci | H01M 2/22 429/238 |
| 2010/0047680 A1 * | 2/2010 | Kao | H01M 2/38 429/118 |
| 2016/0204450 A1 * | 7/2016 | Lee | H01M 2/022 429/118 |

FOREIGN PATENT DOCUMENTS

WO    WO 2016/004843    *    1/2016

OTHER PUBLICATIONS

European Patent Office, International Search Report (Form PCT/ISA/210 and 220, 6 pgs.) and Written Opinion of the international Searching Authority (5 pgs.) dated Oct. 24, 2016.

* cited by examiner

*Primary Examiner* — Anca Eoff
(74) *Attorney, Agent, or Firm* — Wood Herron & Evans LLP

(57) ABSTRACT

The invention is a cathode arrangement comprising a cathode housing defining a space for cathode material and comprising a cathode housing wall being permeable to an electrolyte, and a collector member made of carbon, having a first end part extending into the space for cathode material and a second end part extending outside the space for cathode material, and cathode particles, having a cylindric shape with a diameter of 2-5 mm and being extruded from carbon, are arranged in the space for cathode material. The invention is, furthermore, an energy cell comprising the cathode arrangement, an arrangement for processing hydrogen gas comprising the cathode arrangement and use the energy cell applying seawater or salt water as an electrolyte. Furthermore, the invention is a method for manufacturing the cathode arrangement.

19 Claims, 15 Drawing Sheets

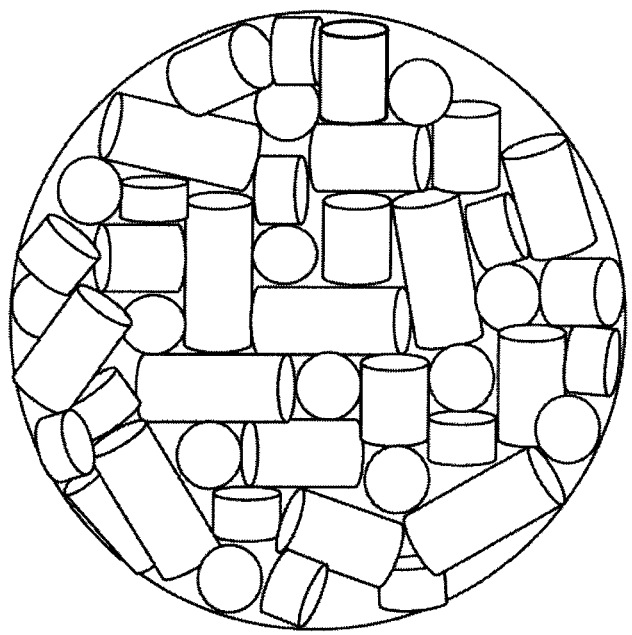
Fig. 5
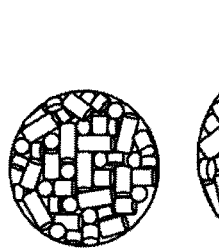 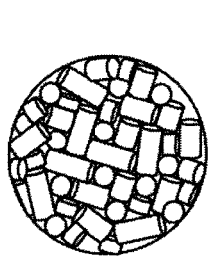 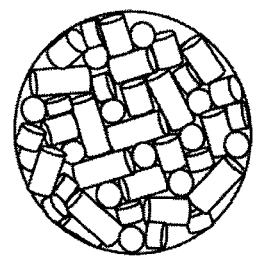
Fig. 7A    Fig. 7B    Fig. 7C
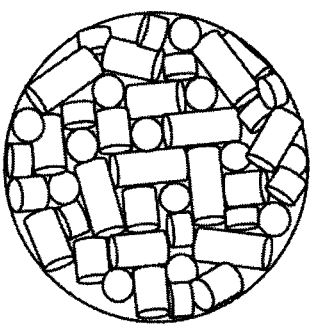 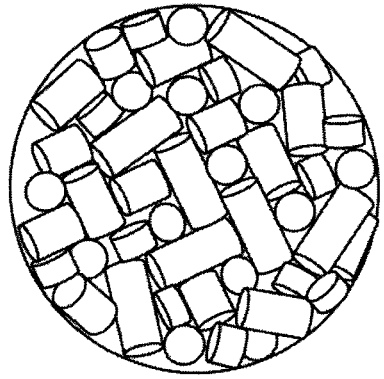
Fig. 7D    Fig. 7E // CATHODE ARRANGEMENT, ENERGY CELL COMPRISING THE SAME, METHOD FOR MANUFACTURING THE CATHODE ARRANGEMENT, AND ARRANGEMENT FOR PROCESSING HYDROGEN GAS This application claims priority, under Section 371 and/or as a continuation under Section 120, to PCT Application No. PCT/HU2016/000006, filed on Jan. 20, 2016, which claims priority to Hungarian Application No. P1500545, filed on Nov. 16, 2015, and also claims priority to Hungarian Application No. P1500018, filed on Jan. 21, 2015.

TECHNICAL FIELD

The invention relates to a cathode arrangement adapted for operation with salt water or seawater as electrolyte, an energy cell comprising the cathode arrangement, an arrangement for processing hydrogen gas comprising the energy cell, and a method for manufacturing the cathode arrangement. The invention further relates to use of the energy cell applying seawater or salt water as an electrolyte.

BACKGROUND ART

It is a well-known physical phenomenon that electricity generation in systems using a galvanic operating principle is made possible by the free-ion conductivity of salts dissolved in water. Research targeted at harnessing—as an electrolyte—the inexhaustible water supply of seas and oceans for the generation of electricity in an efficient and economical manner has been going on for a long time.

Compared to the acids and alkalis (bases) applied in galvanic systems (batteries), seawater is a lot more dilute and is a 'lower-level' electrolyte, which has a great influence on the level of power that can be generated.

In energy cells using the galvanic operating principle, the application of an anode, a cathode, and an electrolyte that match one another is required for economic operation. In the case of the application of seawater as electrolyte it is not possible to modify the composition of the electrolyte, and furthermore, it is strictly prohibited to pollute seawater in any way, i.e. such systems must not have any harmful effect on the environment. Accordingly, research has been focusing on improving the anode and the cathode.

One of the known approaches is the MetalCell battery that can be recharged with saltwater. This development was originally started with military application in mind. It is a small-size emergency battery that is capable of powering a laptop for a few hours. When recharged with saltwater, the battery can be used again but it has a restricted service life, since the magnesium—applied as the anode of the battery—degrades over time. In a dry state the battery can be stored for indefinite time. It needs to be charged only immediately before it is put to use. This development was not directed towards supplying energy on a larger scale; the MetalCell battery has limited dimensions.

A magnesium-air fuel cell is also known. Essentially, this technology employs a vessel made of a gas-diffusion material (cathode) which is filled with seawater, with a magnesium rod (anode) being placed into it. Under the influence of oxygen flowing at the cathode's surface, an oxidation process is started on the anode, which results in an electric current being induced between the anode and the cathode. This method has the drawback that the cells have to be physically separated, and that it can only be applied on free air, in a dry environment.

A seawater battery for powering electric torpedoes has also been developed. The anode material is predominantly magnesium, while the cathode is silver chloride applied to a silver film. The system is capable of producing very high power levels, reaching even 500 mA/cm$^2$, but discharge time is at most 10-15 minutes. It cannot be recharged after use. Because of the silver it has very high production costs.

In the so-called Dunk battery the electrolyte is also seawater and the anode is substantially of magnesium, but the cathode is copper chloride, a material that is harmful to sea environment. Dunk-type batteries are manufactured in a conventional configuration, with physically separated cells. The voltage level of a single cell is 1.5 V. Discharge time is 0.5-15 hours depending on load. The battery cannot be reused after a single use, and is harmful to the environment, so direct sea (marine) application is not possible.

Most of the known seawater- or salt water-activated batteries and electricity generating devices use magnesium as an anode, while the cathode can be made of several different metals (such as stainless steel, copper, titanium), as well as of further compounds such as silver chloride, copper ionide, copper thiocyanate, lead chloride, sodium chloride and copper chloride. These substances are usually either directly or indirectly harmful to sea environments. After use they have to be treated as environmentally hazardous waste.

Further prior art approaches are disclosed in patent documents. In U.S. Pat. No. 2,555,447 an energy cell is disclosed wherein the carbon rod functioning as the positive electrode is surrounded by a volume of matter also containing powder-like carbon, by way of example, graphite. This material assumes a paste- or slurry consistency once it becomes wetted by water or the electrolyte. The material surrounding the positive electrode is encompassed by a layer permeable to the electrolyte. The anode of the energy cell is realized as a container encompassing the electrolyte.

A similar energy cell is described in U.S. Pat. No. 4,020,247, wherein a central collector rod made of carbon is encompassed by a carbon-containing space part that is bounded by a layer that is permeable to the electrolyte. The carbon-containing material is present in the space part surrounding the collector rod in a slurry or powdered form. In this energy cell, also seawater can be applied as an electrolyte.

The common disadvantage of these approaches is that the material present around the collector rod in a powder form becomes slurried. The disadvantages associated with the application of powder-form materials will be described later, in the section related to our experiments.

In US 2015/0037709 A1 an energy cell is disclosed wherein the collector rod is made of graphite and it is surrounded by natural carbon. By way of example, seawater or salt water is applied as an electrolyte in the energy cell. The document does not contain any information as to the shape or geometric dimensions of the natural carbon present in the cell.

In U.S. Pat. Nos. 5,053,375 and 4,885,217 energy cells are disclosed which comprise a single layer of carbon fibres arranged around the cathode. The diameter range of these carbon fibres is between 5 and 15 μm. In the documents reference is made to the application of carbon particles smaller than that.

In U.S. Pat. No. 4,822,698 an energy cell operable by seawater is disclosed that comprises a cathode layer also comprising carbon (powdered carbon). This layer is surrounded by a wall permeable to the seawater electrolyte.

In U.S. Pat. No. 3,849,868 an energy cell is disclosed that comprises a central collector rod, with such a mixture being arranged in the surrounding volume that contains finely divided carbon in addition to the electrolyte. This substance is arranged in a closed container with walls that are not permeable to the electrolyte.

A similar approach is disclosed in U.S. Pat. No. 3,708,344, wherein the material surrounding the collector rod comprises a high percentage of carbon. Such an approach is disclosed in U.S. Pat. No. 2,874,079. A seawater-activated energy cell comprising a carbon cathode is disclosed in JP 60254571 A2.

In U.S. Pat. No. 4,063,006 an energy cell is disclosed which has a cathode comprising carbon and in which seawater is applied as an electrolyte, but the electrolyte does not come into contact with the cathode. Instead, a liquid reagent is brought into contact with the cathode, the reagent being discharged through the same conduit as the seawater functioning as electrolyte. Cathodes comprising activated carbon are mentioned in US 2014/0062382 A1 and WO 89/11165 A1.

In U.S. Pat. No. 3,892,653 a method for generating hydrogen is disclosed wherein magnesium is applied as anode and a carbon rod having similar dimensions as the anode is applied as cathode. The electrolyte is salt water or seawater. The approach according to this document was not developed for generating electricity, but for bringing about a chemical reaction based on the electrode potential difference between the anode and the cathode, using a so-called "short circuit connection". During the reaction hydrogen is generated on the anode and the cathode in the form of bubbles, the hydrogen being removed from the system by circulating the electrolyte.

Apparatuses similar to the above cited energy cell approaches applying a carbon-comprising material in powdered form around the carbon-based collector rod have been tested in our experiments described below.

During the experiments we have tested the application of a mixture of different carbon types and other additives in the cathode. As in many of the documents describing known approaches, the terms 'cathode' and 'cathode arrangement' are meant to cover, in addition to the collector rod, also the conductive material arranged around it. In the three experiments described below, the material AZ63 was used as anode (an alloy of magnesium (91% m/m), aluminium (6% m/m), and zinc (3% m/m)).

In a first experiment a mixture of powdered graphite (diameter: d=0.01 mm; typical deviation ±10-15%) and manganese dioxide ($MnO_2$ with IV oxidation capability) in a 70-30 weight % ratio. A cathode housing with a volume of 63 cm$^3$ that will be described in detail below together with sizes of the collector member was applied in the experiment. The following results has been obtained with this material:

The extractable output voltage was 1.125 V without load.

In a seawater environment (applying seawater as electrolyte), under continuous load the output power decreased drastically over a short period of time due to the rapidly emerging polarization. Accordingly, it is not stabile.

During the operation of the energy cell hydrogen generates in the utilized powdered material. Physical/mechanical separation of this gas is not possible, only chemical depolarization.

The cell cannot be regenerated (due to the gas bubbles getting stuck), and the achievable power is low.

In a second experiment a mixture comprising 70 weight % of powdered graphite (average diameter: d=0.01 mm), 29.25 weight % of manganese dioxide ($MnO_2$(IV)), and 0.75 weight % of nano-carbon (MWCNT—multi-walled carbon nanotubes). Experiments carried out with this material yielded the following results:

The extractable output voltage (1.245V) was slightly higher than in the previous experiment.

In a seawater environment, under continuous load the output power decreases drastically over a short period of time due to the rapidly occurring polarization. Accordingly, it is not stabile.

Physical/mechanical gas separation is not possible, only chemical depolarization.

It cannot be regenerated, and the achievable power is low.

In a third experiment a mixture comprising 70.175 weight % of powdered graphite (average diameter: d=0.01 mm), 27.569 weight % of manganese dioxide ($MnO_2$(IV)), 1.5 weight % of nano-titanium (TINT: titane nanotubes,) and 0.756 weight % of nano-carbon (MWCNT).

The extractable output voltage increased further to 1.436V.

In a seawater environment, under a continuous load of 50 mA and 100 mA the output power decreases drastically over a short period of time due to the rapidly establishing polarization.

Physical/mechanical gas separation is not possible, only chemical depolarization.

It cannot be regenerated, and the achievable power is low.

The system is capable of stable operation for a relatively short time only with a very low load.

The energy density achieved was: 0.005063 W/cm3

As it will be shown in FIG. 9 below, with certain geometric configurations the output voltage falls near 0V in a certain period of time; during the present experiments applying nano-carbon a voltage curve similar to that (approximating 0V) was measured. With powdered materials the disadvantageous effect of slurrying is always strongly present.

According to our experiments the application of powder-structure materials in a seawater environment is not expedient because the produced hydrogen gas cannot successfully escape. The application of nano-carbon highly increases the specific surface of the cathode material, but also binds hydrogen molecules to itself, and thereby increases the internal resistance of the cathode. The presence of hydrogen causes polarization, which is one of the main causes of reduced performance.

In accordance with the above, we have found that long-term power generation is not feasible applying powdered materials.

The sustainability of generated current is jeopardized by polarization occurring in the galvanic energy cell. This phenomenon is caused by hydrogen bubbles produced during the chemical processes involved in electricity generation; the positive electrode getting covered by the bubbles, first only partially but later completely, i.e. the presence of hydrogen gas over the cathode surface results in the reduction of the cathode's performance. The equation describing the corresponding reduction process in seawater is:

$$2H_2O + 2e^- \rightarrow H_2 + 2OH^-$$

The presence of hydrogen first weakens the electric current, and may later completely cut the flow of electrons. This phenomenon can be eliminated by the application of depolarization.

In galvanic energy cells depolarization can be carried out in two ways:

1. Chemically, by applying compounds with high oxygen content, such as manganese dioxide ($MnO_2$ (IV)).

2. Physically, by mechanical gas separation. This latter type of depolarization can be termed 'forced depolarization'.

As it is presented below, our tests have confirmed that in a seawater environment chemical depolarization helps only for a very limited period of time. The chemical reaction taking place in seawater-activated energy cells results in the generation of a significant amount of hydrogen gas. Hydrogen can be bound by high oxygen-content compounds as long as there is oxygen surplus in the compounds. When the compounds cannot bind any further hydrogen, the depolarization process stops. In contrast to conventional galvanic cells, a significantly larger amount of hydrogen is generated per unit time from seawater due to its composition, and thereby in this case the applied depolarization compounds become saturated in a much shorter period of time.

Therefore, the efficient depolarization of energy cells applied in seawater environments is only feasible by means of mechanical gas separation.

In a powdered or granulated form (which is an easily crumbling, small particle-size material) the activated carbon applied in the cathode becomes slurried in seawater, which results in that the electrically conductive connections between the particles terminates. In order to prevent this, the activated carbon has to be compacted applying high pressure forces, so that the electrically conductive connections are reinforced by increasing the surface area in contact. However, the size of the passages between the particles of the compacted material thus obtained (which can even be capillary-type, i.e. such passages wherein the flow of the liquid is governed by capillary forces) is reduced by such an extent that these passages are not large enough to allow for the mechanical separation of the generated gases. The experiments have confirmed that hydrogen produced in such energy cells is removed only from the outside layers of the anode, while it gets accumulated in the inside.

In light of the known approaches the need has arisen for a cathode arrangement and an energy cell applying the cathode arrangement that can be operated utilizing seawater or salt water at a stable output voltage for a long time, wherein forced depolarization can be applied with high efficiency.

DESCRIPTION OF THE INVENTION

The primary object of the invention is to provide a cathode arrangement, a method for manufacturing the same, and an energy cell made applying the cathode arrangement, which are free from the disadvantages of prior art approaches to the greatest possible extent.

An object of the invention is to provide a cathode arrangement and an energy cell applying the cathode arrangement that can be operated utilizing seawater or salt water in a stable manner for a long time, wherein forced depolarization can be applied with high efficiency. A further object of the invention is preferably to provide an energy cell operable utilizing seawater or salt water that can be connected in series with multiple such cells even if a common electrolyte and a common anode are applied.

An object of the invention is to provide a cathode arrangement and an energy cell in which the cathode arrangement is applied that are adapted primarily for supplying power to devices and apparatuses utilized on the sea. A further object of the invention is to provide an energy cell for generating electricity which, due to its configuration, is adapted for power generation under deep sea (5000 m+) conditions. Applying such an energy cell, the electric energy supply of maritime life saving systems, alarm systems, robotic deep sea explorers, underwater lighting devices, sea buoys, marine biology and wave observation stations can be provided, as well as the electric energy supply of further such devices or equipment that are used under sea (maritime) conditions.

An object of the invention is to provide a cathode arrangement and an energy cell applying the cathode arrangement that conform to the requirements of environmental protection, safety, and economy.

The objects of the invention can be achieved by the cathode arrangement according to claim 1, by the energy cell according to claim 12, by the arrangement for processing hydrogen gas according to claim 16, by the use according to claim 17, and by the manufacturing method according to claim 18. Preferred embodiments of the invention are defined in the dependent claims.

The energy cell is such an apparatus which comprises a cathode and an anode, and can be operated by submerging the cathode and the anode in an electrolyte. The energy cell according to the invention, is, therefore, an assembly having an anode and a cathode (the cathode arrangement according to the invention), which does not in itself comprise an electrolyte.

Applying the energy cell according to the invention, readily available electric energy can be generated exploiting the free-ion conductivity of electrolytes formed by salts dissolved naturally in seawater or artificially in freshwater. The generated electricity can be used in a very wide range of applications, such as to directly supply electric energy to sports equipment, life saving equipment and apparatuses, as well as to various floating vehicles.

In the energy cell according to the invention preferably seawater or salt water can be utilized as an electrolyte, but any other aqueous solution can be applied that is rich in minerals and comprises a high amount of free ions.

Because of the application of extruded cathode particles the cathode arrangement according to the invention has simpler configuration and can be produced in a simpler manner compared to known approaches.

According to the invention we have recognised that the appropriate geometric configuration of the activated carbon particles (cathode particles) is of particular importance in a depolarization, in the mechanical separation and removal of the generated hydrogen gas.

BRIEF DESCRIPTION OF THE DRAWINGS

Preferred embodiments of the invention are described below by way of example with reference to the following drawings, where FIG. 5 is a schematic drawing illustrating the pattern formed by a part of the cathode particles in an embodiment of the cathode arrangement according to the invention, FIGS. 7A-7E are schematic drawings illustrating the respective patterns formed by differently sized cathode particles.

MODES FOR CARRYING OUT THE INVENTION

Figure 1:
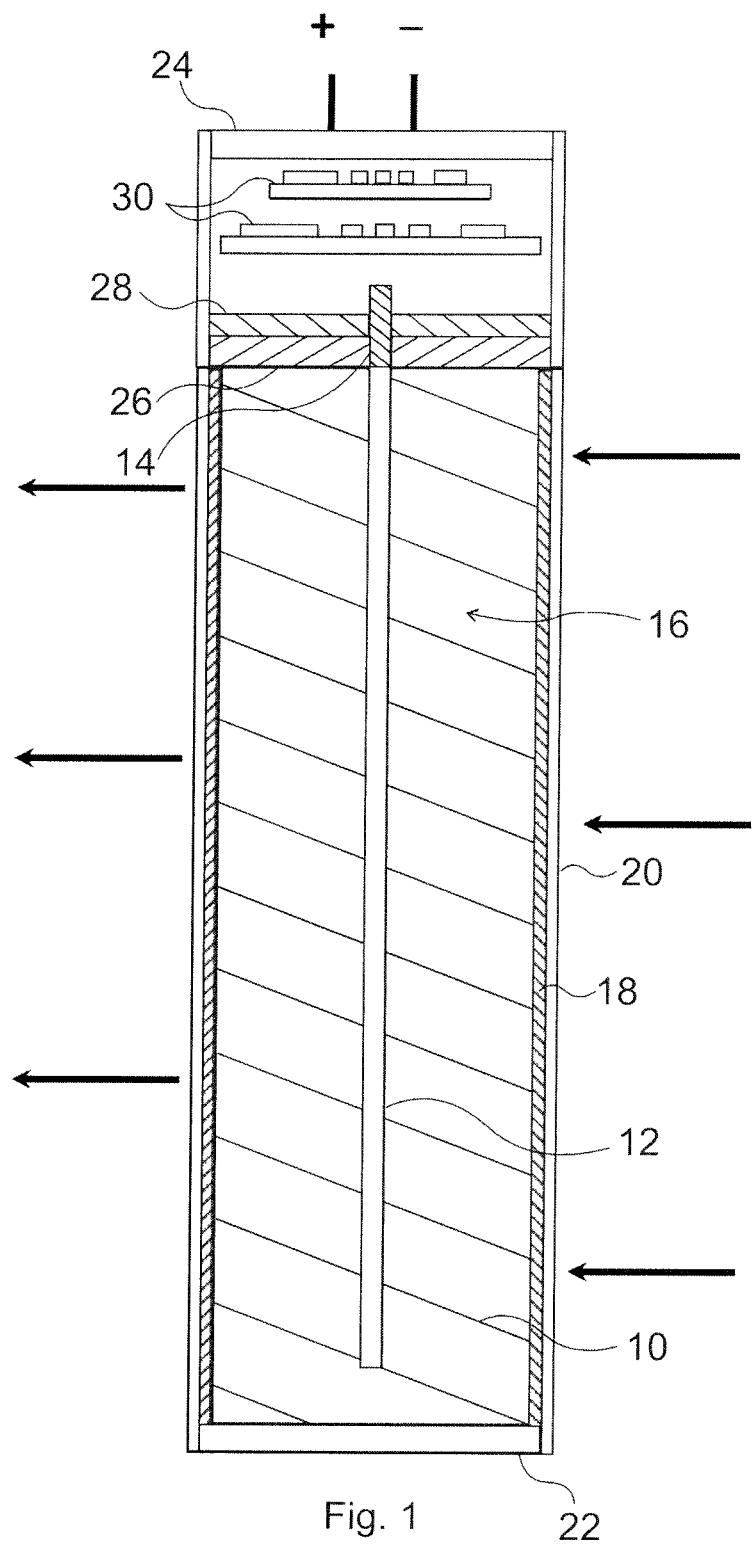
FIG. 1 is a schematic side view of an embodiment of the cathode arrangement according to the invention.

FIG. 1 illustrates an embodiment of the cathode arrangement according to the invention. In this embodiment, the cathode arrangement comprises a cathode housing 20 defining a space 16 for cathode material and comprising a cathode housing wall being permeable to an electrolyte (e.g. it is perforated), and a collector member made of carbon, having a first end part extending into the space 16 for cathode material and a second end part extending outside the space 16 for cathode material. Cathode particles 10 (cathode pellets), having a cylindric shape (rod-shape) with a diameter of 2-5 mm and being extruded from carbon—preferably extruded from activated carbon—are arranged in the space 16 for cathode material of the cathode housing 20. The term 'cathode particle' therefore refers to cylindric-shaped rodlets (rods, sticks) made from a carbon material by extrusion. For reasons explained in detail below, the cathode arrangement configured in this way is especially suitable for reaching that the electrolyte passing through (flowing or driven through) the cathode arrangement carries out physical depolarization.

By 'cylindric shape' it is meant that the shape is approximately cylindrical;

accordingly the cross section perpendicular to the longitudinal axis a circle, an ellipse being only slightly flatten compared to a circle, or a similar but slightly irregular shape. In case the cross sectional shape is not circular, the diameter of the cylindric shape is an effective diameter, which is the diameter of the circle drawn around the irregular shape. In sum, it can be stated that the cathode particles have a cylindrical-like configuration.

In an embodiment of the invention the cathode particles are arranged in the space for cathode material as compacted. In the space for cathode material the cathode particles are compacted applying a pressure force of 30-100 N for each $cm^2$ of the surface subjected to pressure forces, and particularly preferably they are compacted applying a pressure force of 55-75 N for each $cm^2$ of the surface subjected to pressure forces.

Figure 2:
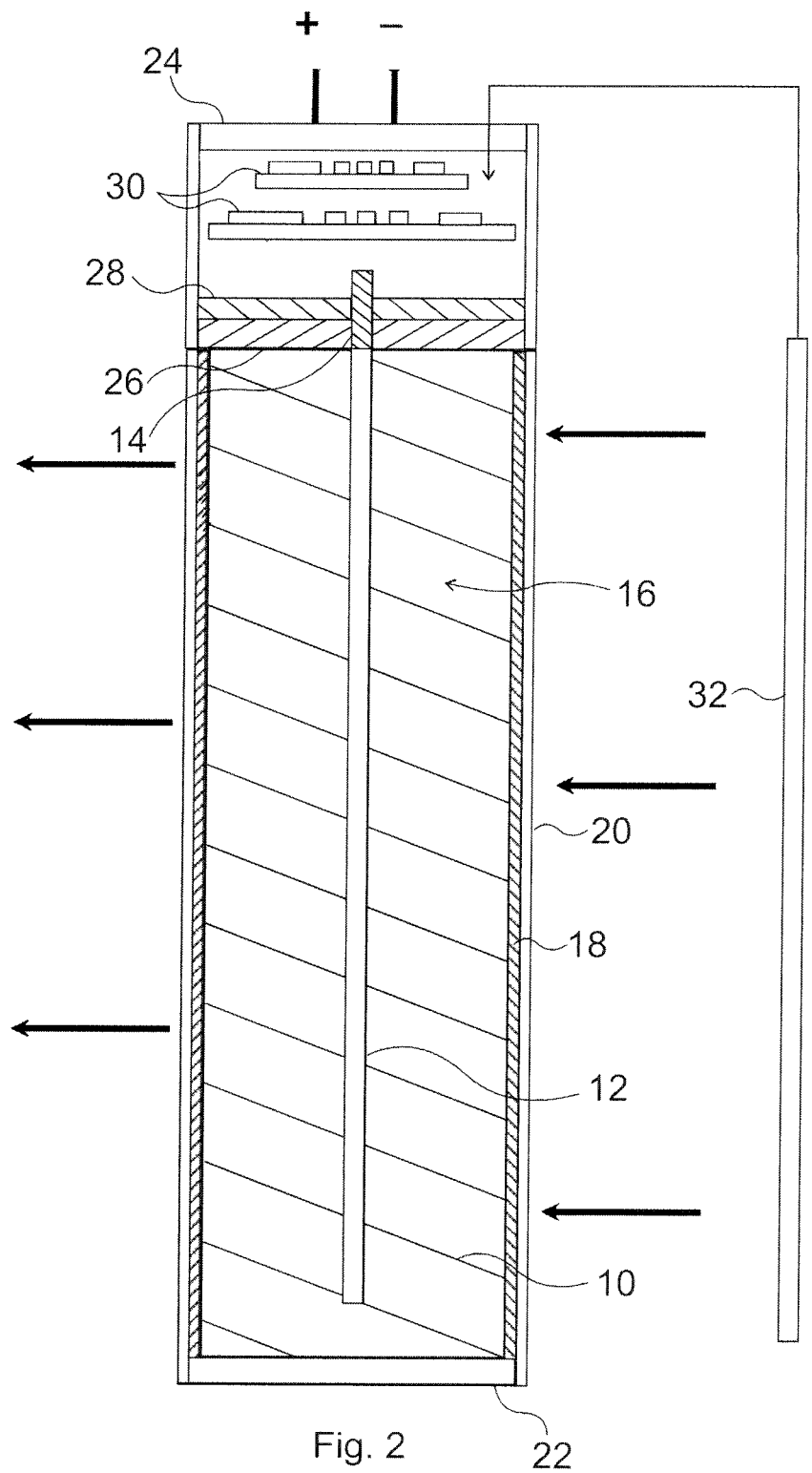
FIG. 2 shows the cathode arrangement of in FIG. 1 also showing the anode.

In the present embodiment the collector member is a collector rod 12, the cathode housing has a cylindrical shape, and the collector rod 12 is arranged along the axis of symmetry of the cathode housing. In FIG. 1 it is shown that a significant part of the collector rod extends into the interior of the cathode housing, i.e. into the space 16 for cathode material. In this embodiment the second end part of the collector rod 12 is provided with a silver coating and is arranged to extend into a control housing; said control housing is connected to the cathode housing 20 and comprises control electronic device 30. In FIG. 1 the control electronic device 30 is shown only very schematically, naturally, it is not arranged floating inside the control housing. As shown in FIG. 1, the collector rod 12 extends into the control housing only to a small extent, while the silver coating applied to the collector rod reaching even the space 16 for cathode material. The second end part of the collector rod can be applied as a positive pole of an energy cell, as illustrated in FIG. 2 which also shows an anode 32 functioning as a negative pole. In FIG. 1 both the positive and negative poles are shown at the top of the control housing, because a control electronic device is arranged between the second end part of the collector rod and the positive pole applied as the output terminal. The negative pole of the anode is also connected to the control electronic device, the negative pole applied as an output terminal being also lead out from the control electronic device. The control electronic device and the second end part of the collector rod 12 are connected by means of metallic connection.

As shown in FIG. 1, a water-impermeable separator 26 and a pressure-retaining insulation 28—the latter encompassing the second end part—are arranged between the space 16 for cathode material and the control housing; the pressure-retaining insulation 28—and also the other pressure-retaining insulations of the arrangement—are preferably made of a synthetic resin. The connected part of the cathode housing and the control housing is configured in this manner to prevent electrolyte from entering the control housing, which would negatively affect the operation of the control electronic device.

As shown in FIG. 1, a separator filter 18 is arranged along the inside of the cylindrical walls of the cathode housing 20, the separator filter 18 thereby encompassing the cathode material, i.e. the preferably compacted aggregation (cluster) of cathode particles arranged inside the space 16 for cathode material. In this embodiment of course, the electrolyte is able to penetrate through the cylindrical part (side wall) of the cathode housing, i.e. this cathode housing wall is permeable to the electrolyte, and this is why the separator filter 18 is arranged along this wall. A bottom closure member 22 is arranged at the lower extremity of the cathode housing, with—as is apparent in light of the method for producing the cathode arrangement—the bottom closure member 22 being preferably mounted to the cathode housing afterwards. An upper closure member 24, adapted for closing the control housing from above, is preferably also configured to be connectable afterwards. The control housing is preferably closed off after the control electronic device 30 has been arranged therein. In FIG. 1, the motion of electrolyte is indicated by arrows, showing that the electrolyte enters the space 16 for cathode material from the right in the figure, and that the electrolyte leaves the cathode housing, carrying hydrogen gas generated in the process, to the left in the figure. In this embodiment, therefore, a separator filter is arranged along that cathode housing wall which is permeable to the electrolyte.

The cylindrically shaped part of the cathode housing preferably has a mesh structure providing for permeability to the electrolyte, i.e. essentially, permeability to water. The water-impermeable separator 26 is preferably made of plastic. The control housing preferably has a pressure-retaining configuration, the upper closure member 24 is preferably a pressure resistant plastic cover.

Some embodiments of the invention relate to an energy cell made utilizing an embodiment of the cathode arrangement according to the invention. In FIG. 2 an embodiment of the energy cell according to the invention, adapted for use preferably with seawater or salt water as an electrolyte is shown, as being complemented with the anode 32; the energy cell, accordingly, comprising an anode and the embodiment of the cathode arrangement according to the invention of FIG. 1.

Figure 3:
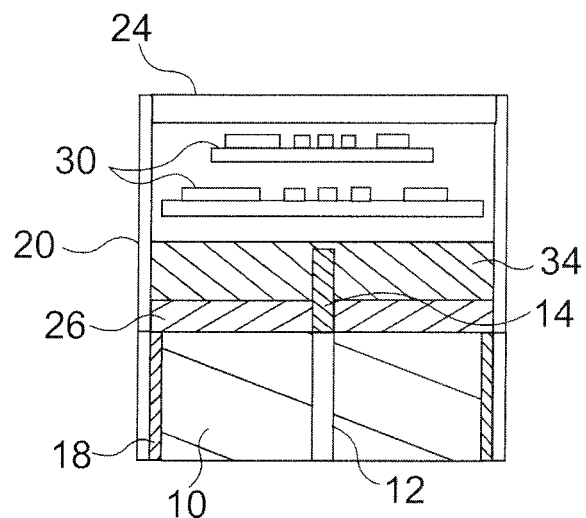
FIG. 3 is a schematic side view of an embodiment of a head assembly connected to the cathode arrangement according to the invention.
Figure 4:
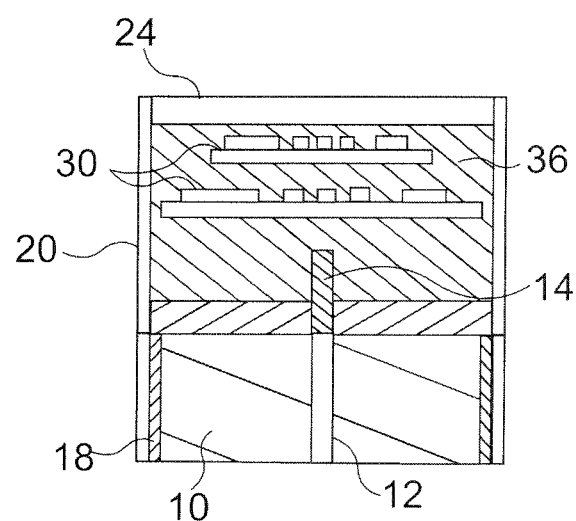
FIG. 4 is a schematic side view of a further embodiment of a head assembly connected to the cathode arrangement according to the invention.

In FIG. 1 the pressure-retaining insulation 28 is arranged to provide insulation around the second end part of the collector rod 12, particularly in the region where the collector rod 12 extends from the cathode housing 20. In FIG. 3 an embodiment is illustrated in which the pressure-retaining insulation 34 encompasses the second end part of the collector rod 12, i.e. it completely insulates the second end part provided with a silver coating. In FIG. 4 an embodiment is shown in which the pressure-retaining insulation 36 completely fills the interior of the control housing. This embodiment is preferably utilized in applications where very high (external) pressure is present.

In the embodiment illustrated in FIGS. 1 to 4, therefore, a pressure-retaining insulation, at least partly surrounding the second end part of the collector member, is arranged fitting to the outside surface of the cathode housing; the pressure-retaining insulation partly encompassing the second end part in the embodiment of FIG. 1, and fully encompassing it in the embodiment according to FIGS. 3 and 4.

The cathode housing can be configured to have essentially any shape. In our experiments we have most often tested cylindrical-body cathodes, but other shapes including prisms, cubes, blocks and more complex shapes were also made. Measurement results have confirmed in every case that shape does not have an effect on the performance of the cathode material. For increased durability, a sea-proof and silicone-free plastic material may be applied for making the cathode housing.
 a. Seawater-proof plastic is a very durable, rugged material. Its dimensions do not change despite the effects of seawater and changes of ambient temperature.
 b. Due to their silicon content, silicones become electrically conductive in a seawater environment under the effect of direct current. In certain cases they may cause the active cathode to malfunction.

In FIGS. 1 to 4 the most frequently applied configuration, the cylindrical one is illustrated (wherein the collector member is an—preferably, circular cross-section—collector rod). However, in the cathode arrangement according to the invention the cathode housing and the space for cathode material defined by it can be of any shape; by way of example, a rectangular block-shaped cathode housing can be applied, the rectangular block defining a space for cathode material into which a rectangular (plate-shaped) collector member (which is dimensioned such that it does not reach the cathode housing walls except, of course, the one to which it is connected) extends from one side, the cathode particles being arranged around this collector member. In case of a collector rod, the end parts of the collector member are constituted by the rod's ends, while in case of a collector member with a rectangular (low thickness rectangular block) shape these are constituted by opposite edges of the rectangle. The collector member may of course have a shape different from the above mentioned ones (rod, rectangle).

In FIG. 5 a pattern formed by the cylindric-shaped cathode particles according to the invention is illustrated in a given region, a small sub-region of the space for cathode material. In FIG. 5 it can be observed that the particles have different length but substantially identical diameter. FIG. 5 illustrates the passages among the cathode particles. As shown, the particles are pressed against one another due to the compacting, but still there are passages formed among them. In FIG. 5 there are depicted some cathode particles which are situated further back in the given region of the space for cathode material, i.e. they are partially obstructed from view by the particles situated more to the front. Of course, the aggregation of cathode particles comprises a system of passages in all three spatial directions, thereby providing a suitable flow path for the electrolyte.

Due to their cylindric shape, the particles are not able to line up closely next to one another, and can be in contact along at most a single line of their cylindric surfaces, given their axes are parallel (this occurs rarely because of the random pattern), or can become lined up one after the other, their flat end parts being in contact. This latter situation, however, does not have a significant effect to the 'conglomeration' of the particles is concerned, since it is virtually the same as if a single, longer particle—composed of two shorter ones—was there. Thereby, in addition that, due to such arrangement of the particles and to the small contacting surfaces, a system of passages establishes, the contact points indispensable for the operation of the cell are also provided between the particles. The particles, therefore, constitute a large, interconnected network around the collector member, with essentially point-like contacts between the individual particles. Thanks to this, the aggregation of cathode particles becomes capable of generating electricity once the electrolyte passes in the aggregation, because charged particles can be transferred through the contact points between the well-conducting cathode particles, and can reach the collector member. By means of the preferably applied compaction (thanks to which adjacent particles are pressed against each other) even more contact points can be established in the non-compacted aggregation of cathode particles (which aggregation, depending on the manner of stacking, can be a loose one); our experiences show that the power output of the energy cell can be sufficiently high for a long period of time in case the cathode particles are compacted applying a pressure force of 30-100 N for each $cm^2$ on the surface subjected to pressure forces, and particularly preferably they are compacted applying a pressure force of 55-75 N for each $cm^2$ on the surface subjected to pressure forces. In specific cases the cathode particles can be stacked so densely that a sufficient number of contact points is provided even without compaction.

In FIGS. 7A to 7E patterns of differently sized cathode particles are illustrated. FIGS. 7A-7E illustrate the pattern of particles having a diameter of 1, 2, 3, 4, and 5 mm, respectively. Each of these figures shows the output of a computer simulation run with the particular dimensions, i.e. as shown in the figures, the pattern is different for each simulation run. Of course the figures are not to scale, but in the computer simulation on which they are based had the dimensions of the particles specified. It is shown in the figures that for a particle diameter of 1 mm there is a high degree of ordering, while with 2 mm and above, larger-sized passages can be observed among the cathode particles.

Figure 6:
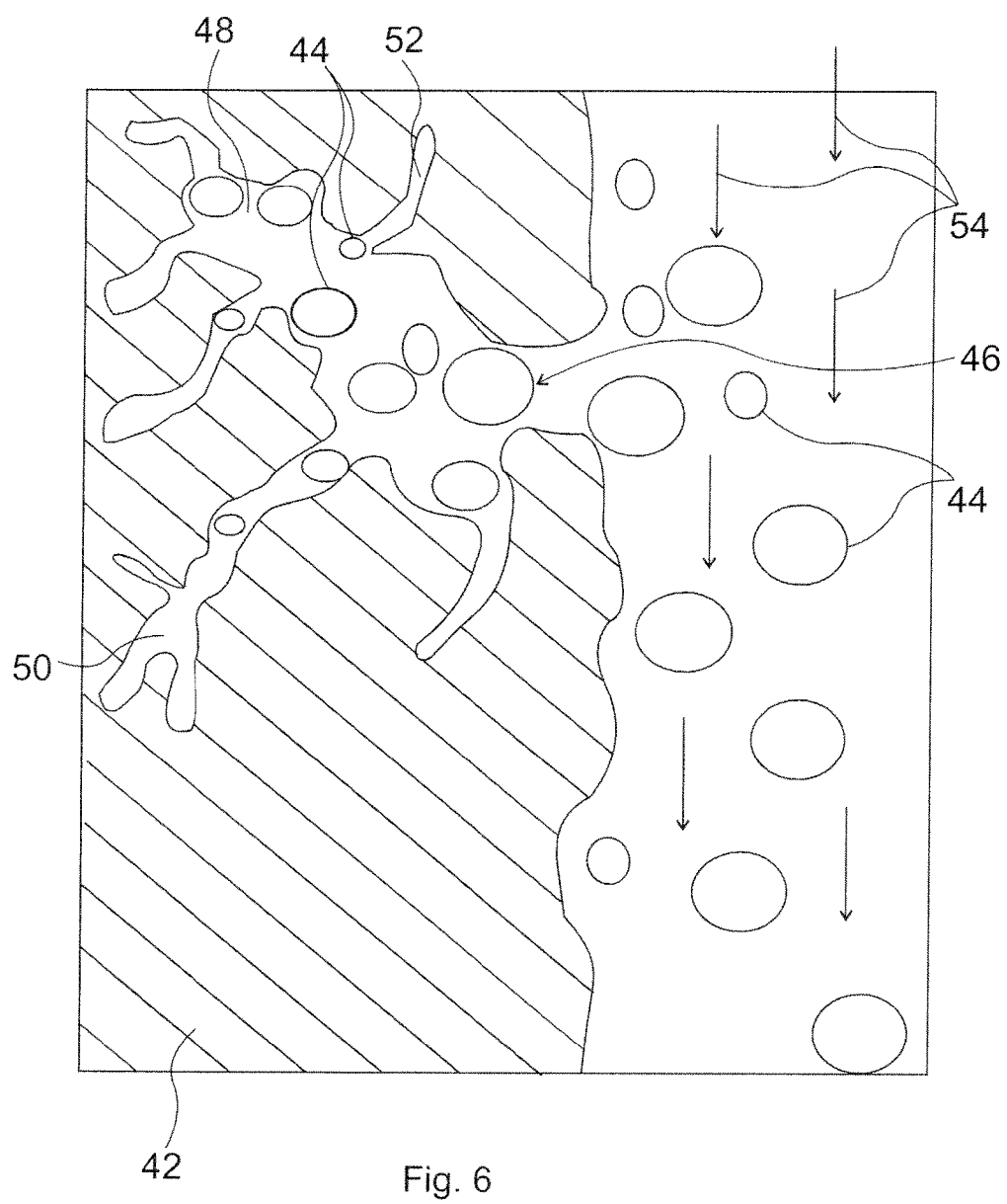
FIG. 6 is a schematic sectional drawing depicting the structure of the side wall of the cathode particles.

FIG. 6 shows a detail of a cathode particle 42 is shown in section view. The figure illustrates a passage 46 that opens from the surface of the cathode particle 42, with, among others, a macro-passage 48, a meso-passage 50 and a micro-passage 52 opening from it. As shown in FIG. 6, hydrogen bubbles 44 of different size generate both outside the cathode particle 42 and in the different passages. In case the passages are very deep (long; typically in case of a cathode particle having a diameter larger than 5 mm), hydrogen bubbles 44 may get stuck inside the passage such that they cannot be driven out by the electrolyte flow. Stuck hydrogen bubbles 44 can highly reduce the specific surface (to which the internal passages add an addition) of the cathode particle 42. In FIG. 6 an electrolyte flow direction 54 is indicated.

The cylindric configuration of the cathode particles is advantageous for a number of reasons. On the one hand, the shape made by the cylindric extrusion of the powder-like material obtained from the precursor carbonized in an oxygen-free environment can be produced in a particularly simple and inexpensive manner. During cylindric extrusion and activation an appropriately stable interconnection between the material parts can be obtained, which lends sufficient strength and excellent physical durability also to the final product. During the extrusion process a kind of surface diffusion phenomenon is established among the carbon particles forming the cathode particle, which contributes to keeping together the extruded cathode particle.

Although strength parameters equalling those of the cylindric configuration could also be attained by utilizing a ball shape, a significantly more complex and more costly production process would be involved. A further disadvantage of the ball shape is that—due to the applied manufacturing process—it has significantly lower specific surface than the cylindric shape. Accordingly, the cylindric shape is exclusively applied for the cathode particles according to the invention. All other geometric shapes (e.g. shapes with corners, polygon-based blocks) easily lose their firmness during compaction, break and become crumbled. In case such cathode particles were applied, the resulting fragments could even block some of the passages. Also, the flat walls of such bodies may even get pressed against one another, which would counteract the production of sufficiently large-sized passages. In contrast to that, cylindric cathode particles can bear higher compaction pressure forces, and also withstand the surface erosion effects resulting from the flow of the electrolyte.

The characteristic dimension of the passages between the particles (essentially, an effective diameter) is in the range of 0.2-2 mm with the dimensions according to the invention. Since the length of the particles varies from particle to particle, the characteristic dimension of the established passages varies, too. The cylindric configuration and variable length of the particles, as well as the dimension of the passages established due to the unordered pattern (arrangement) of them is sufficient for providing depolarization by means of the exchange of electrolyte required for the continuous operation of the cathode (the exchange of salt water/seawater electrolyte, is provided either in a forced manner—e.g. by a pump—or by means of natural movements of the water).

During the chemical reaction taking place in energy cells utilizing seawater a significant amount of hydrogen gas is generated, the presence of which reduces or prevents the flow of electrons. For stable operation the generated hydrogen must be separated from the surface of the cathode electrode. In the energy cell according to the invention separation is carried out mechanically, by means of forced depolarization (for this reason the cathode particles are arranged such that the passages between them allow for sufficient electrolyte flow).

Polarization occurs in every energy cell that uses a galvanic operating principle and applies a liquid electrolyte. In known galvanic cells the problem of depolarization is solved chemically. We do not know about any applications in apparatuses being available commercially or in industrial use of the forced depolarization brought about by moving water and discussed in relation to the energy cell according to the invention.

Certain known approaches referenced above apply depolarization brought about by moving water (particularly, electrolyte) exclusively with methods wherein the cathode electrode is a solid carbon or graphite rod, or a plate or rod made of a metal. Hydrogen gas generates in the form of micro-bubbles over the entire surface of the cathode electrode. During forced depolarization the bubbles (and thus the micro-bubbles) are carried off by the moving water, and thereby the surface of the cathode electrode is kept clear of gases. With solid graphite or carbon rods, however, it only removes the generated gas from the outside surfaces. Gases are unable to escape from the micro-capillary spaces between the particles, and thereby the performance of the cathode electrode is drastically reduced. In methods wherein the cathode electrode is made of a metal forced depolarization operates effectively, but metal cathode electrodes have low specific surface and thereby the cell has very low power.

To obtain an efficient energy cell, a balance between the material, the geometric configuration and the specific surface of the cathode electrode is required. To our current knowledge the best material for the cathode electrode is activated carbon, since it can achieve the highest electrode potential levels with respect to the applied anode material. The specific surface of activated carbon is many times greater than the specific surface of other carbon and graphite materials applied in known approaches. Geometric configuration has a high influence on the specific surface of the cathode electrode and on depolarization. The extruded cylindric shape and the associated dimensions (a diameter of 2-5 mm, preferably 3-4 mm) applied in the cathode arrangement according to the invention are especially suitable for seawater applications.

During extrusion small diameter inaccuracies (in the order of tenths of millimetres) may be present in manufacturing the cathode particles, depending on manufacturing conditions. The most preferred diameter of the cathode particles applied in the cathode arrangement according to the invention is 3 mm, which, taking into account the manufacturing inaccuracies implies that the diameter of the most preferably applicable cathode particles is between 2.8 and 3.2 mm. This manufacturing inaccuracy (approximately ±0.2 mm) also manifests itself in the case of the limits of the above defined ranges of 2-5 mm and 3-4 mm, i.e. in fact these ranges are broadened by the manufacturing inaccuracy. These inaccuracies may occur even during a single manufacturing phase, and thus such manufacturing inaccuracies should be taken into account when interpreting the disclosed measurement data.

As it will be detailed later, in case of overly small particles (below a diameter of 2 mm), the specific surface is high, but depolarization is inadequate with such a geometry due to the overly small passages established during the pressing (compacting) operation. In case of overly large particles the passages are also large, but the specific surface is drastically reduced as only a much smaller amount of activated carbon material can be placed into a given volume due to the size of the particles. In addition to that, moving water can only partly remove the micro-bubbles, or even cannot remove them at all, from the interior of large-sized particles. This phenomenon results in a further reduction of the specific surface of the cathode electrode, which negatively affects the performance of the system.

With systems having lower power requirements the energy cell constituted by the cathode arrangement according to the invention and the anode is arranged in a so-called 'submerged' or free-flow manner. Such systems are exemplified by divers' lights, distress signal devices, energy cells for lifeboats, etc.

In this case it is the energy cell itself which moves in the water (seawater, salt water), so continuous electrolyte exchange is provided. Hydrogen and magnesium hydroxide generated in the cell are continuously removed from the system by means of the electrolyte exchange. Thereby, the surface of the cathode is kept clean and at the same time, continuous active power generation is ensured.

Pressurized electrolyte exchange systems can be applied with systems having higher power demand, or in situations where directly submerging the energy cells in the electrolyte is not feasible. Such systems are exemplified by power systems for boats/ships, onshore power generation devices, etc.

Figure 10:
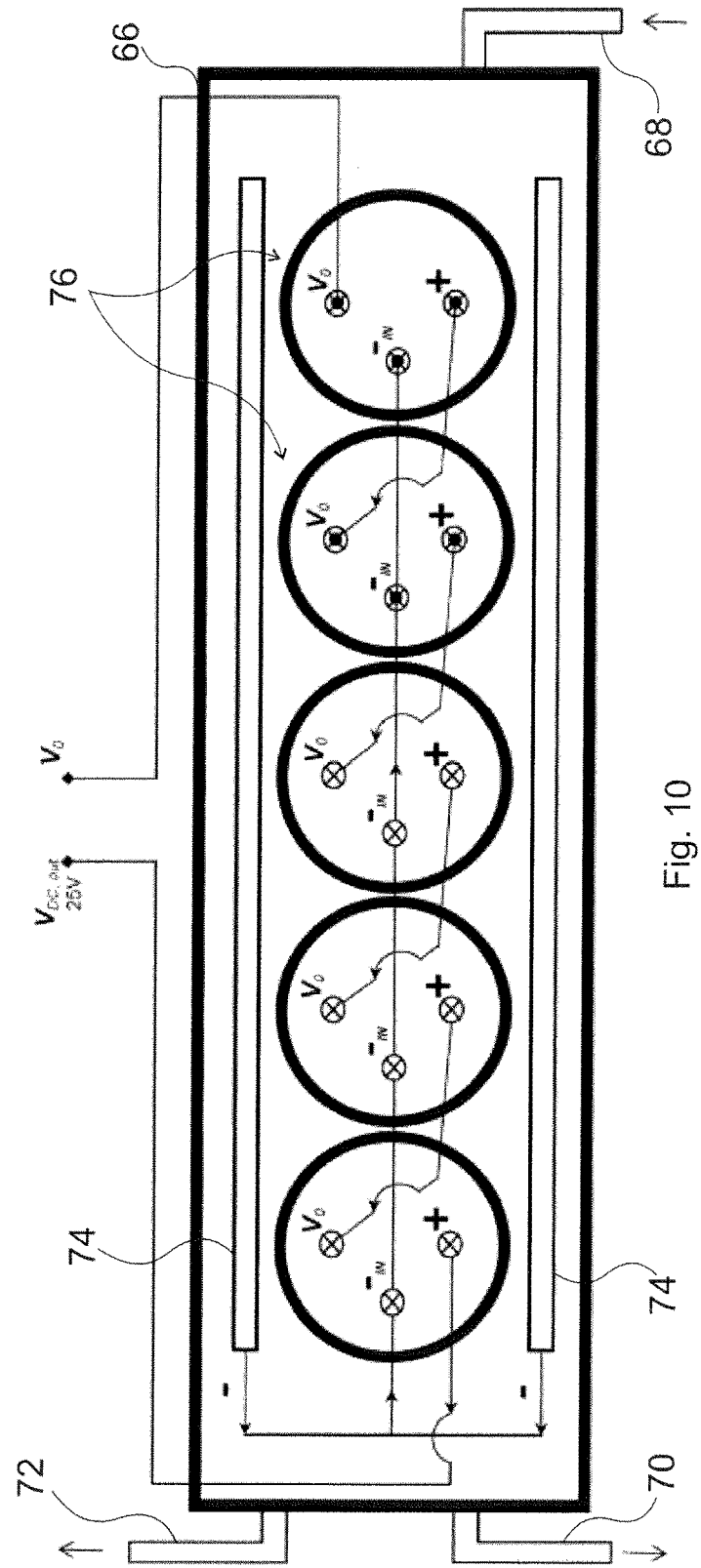
FIG. 10 is an arrangement comprising multiple series-connected cathode arrangements according to the invention.
Figure 16:
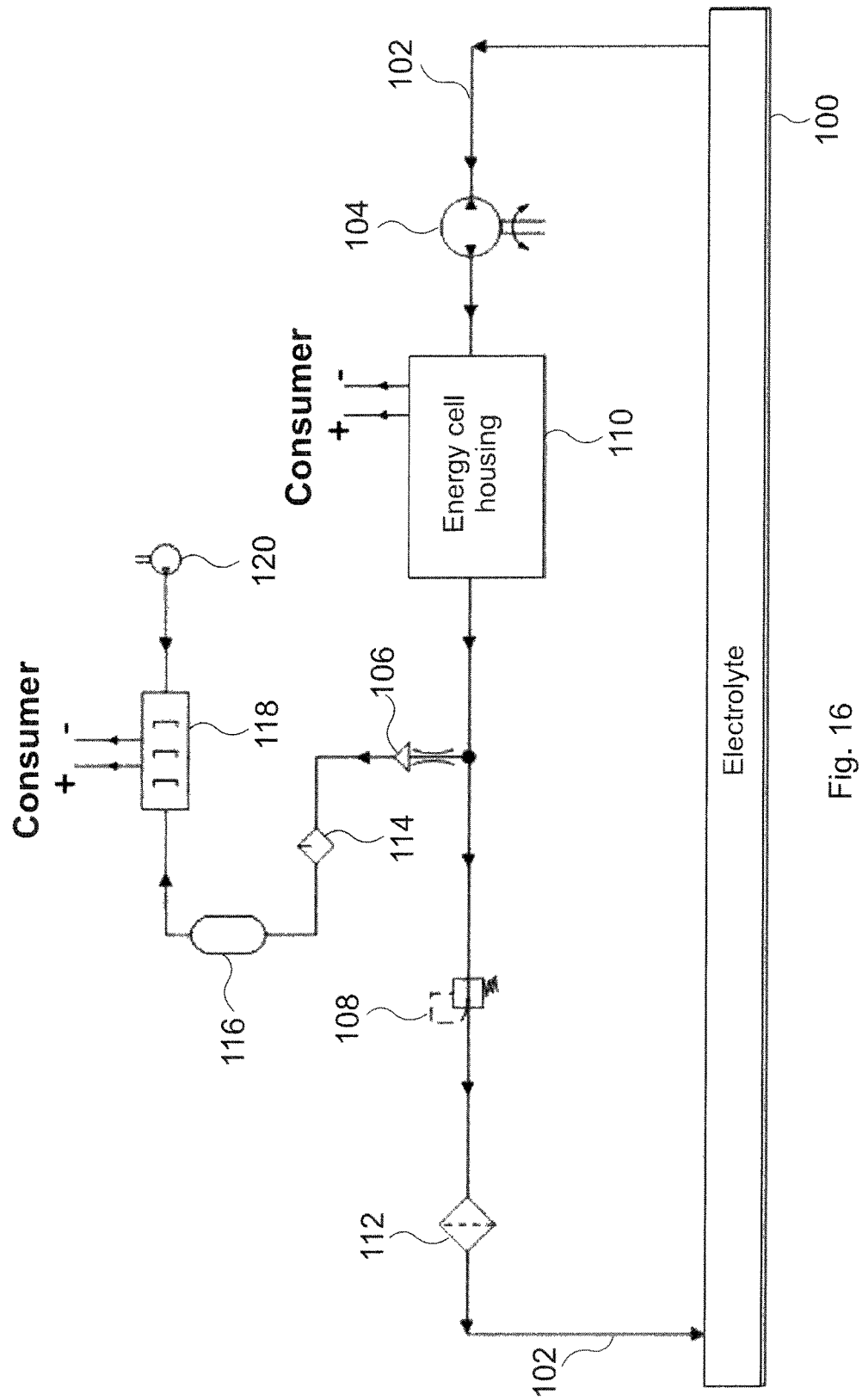
FIG. 16 is a schematic block diagram of a system applying the cathode arrangement according to the invention.

In the case of pressurized electrolyte exchange the energy cell or cells are installed in a pressure-resistant container. The electrolyte is fed to the container comprising the energy cells through an inlet by means of a pump, and is removed therefrom through an outlet port. Hydrogen and magnesium hydroxide produced in the cell are continuously removed from the system by means of the electrolyte exchange. Thereby, the surface of the cathode is kept clean and at the same time, continuous active power generation is provided. Such systems are depicted in FIGS. 10 and 16. The operating pressure of such systems is usually 1-3 bar.

Lead by the negative experiences with powdered cathode materials in our experiments we began experimenting with a cathode arrangement wherein—thanks to the cylindric rod (stick-like) shape of the cathode particles—passages are formed between the unordered cathode particles, through which the hydrogen bubbles responsible for polarization can be driven off from among the particles. In a particularly preferred manner, in the systems under investigation gas is driven out applying salt water or seawater that function as the electrolyte.

A series of experiments have been carried out in relation to the geometric configuration of the cathode particles. For the experiments an apparatus adapted for investigating/measuring the effects of forced depolarization was made. The apparatus is constituted by a cylindrical container, wherein a salt water mixture (as an electrolyte) was circulated at a pressure of 3 bar by means of a pump. Two magnesium anodes and a cathode housing were also situated in the cylindrical body, the cathode housing being arranged such that the electrolyte circulated under pressure could only leave the container after it has passed through the cathode. Thereby, it became possible that the electrolyte passing between the cathode particles can separate hydrogen bubbles generated during operation from the cathode surface and carry them off. Because cathode housing has predefined dimensions, the cathode electrode materials of different geometric configuration were tested inside the same volume.

Based on our experiments (including the above described results of the experiments carried out with powder-like electrode materials), powder and granulated carbon and graphite materials forming tiny particles (for the exact specification of the size, see below) are not suitable for stable power generation. This is because under the pressure of water the small-sized cathode material particles completely blocked the movement of the electrolyte (the electrolyte flow causes the smaller particles to obstruct the passages), and therefore depolarization cannot take place. In order to find the adequate size of the passages—even as small as being able to operate on the capillary principle—cathode particle aggregations of extruded activated carbon rods having different geometric dimensions and different precursors (wood, peat, coconut shell, as specified in Table 3 below) were tested. In case capillary-sized passages are present it can be sufficient for appropriate operation if the electrolyte can penetrate into the capillaries and can remove the generated hydrogen gas molecules therefrom. During our measurements cathodes comprising activated carbon rods (cathode particles) having diameters of 1, 3, and 8 mm, respectively, were tested.

Figure 8:
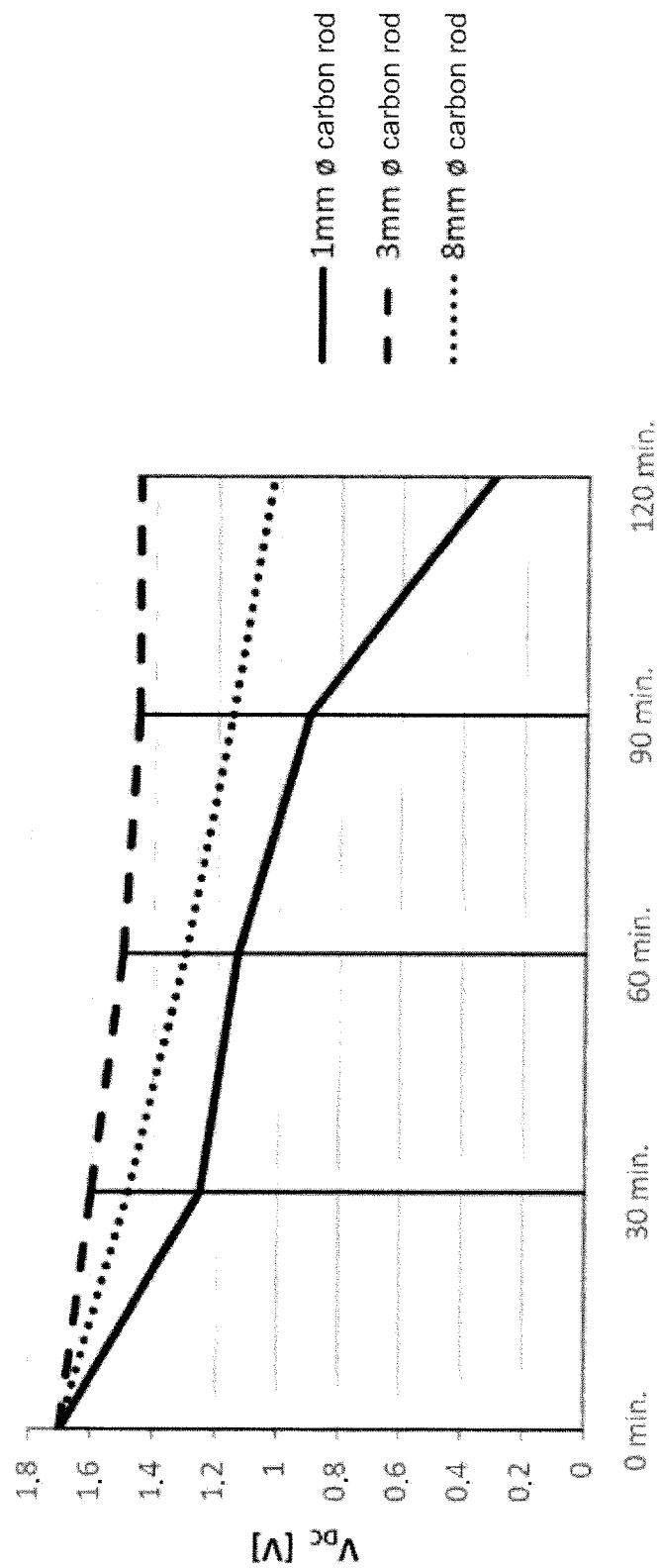
FIG. 8 shows the output voltage versus time graph of the cathode arrangement obtained applying cathode particles of different sizes.
Figure 9:
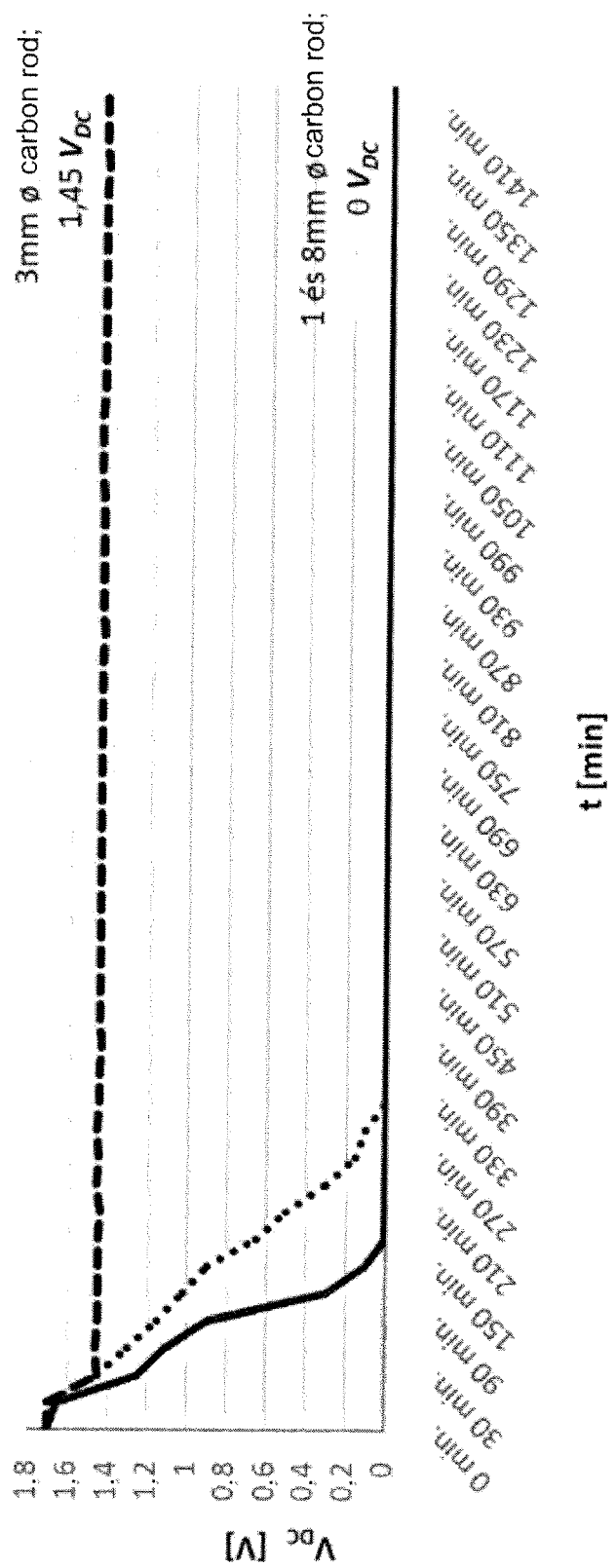
FIG. 9 is a graph also showing values of the curve shown in FIG. 8 corresponding to long terms.

The results of the experiment are shown in FIGS. 8 and 9 (in FIG. 8 it is shown which diameter corresponds to which curve, in FIG. 9 the same marking is applied). The following conclusions have been drawn from the results:

a. The narrow spaced formed during the experiments between the 1-mm-sized extruded activated carbon particles are not sufficient for achieving depolarization. In this case the electrolyte can pass through the cathode material only very slowly; the speed of its movement is not sufficient for achieving the required depolarization level.

b. The experiment confirmed that the passages between extruded activated carbon particles having a diameter of 3 mm are of a suitable size for achieving an appropriate depolarization effect. In this case the electrolyte can pass through the cathode material with a speed that is sufficient for achieving the required depolarization level. As shown in FIGS. 8 and 9, based on the measured results the output voltage rapidly (in approx. 60-90 minutes) decreases from its initial value by 10-15%. The initial decrease is caused by that—until it is separated—the continuously generated hydrogen gas blocks the movement of electrons over the gas-covered surface of the cathode material. After that, with cathode particles having a diameter of 3 mm, the voltage settles to a substantially constant value that can be sustained as long as there is a continuous electrolyte movement. After stopping the electrolyte flow, the performance of the energy cell falls drastically (by 50-60%), with the voltage and output power returning to the original levels once the electrolyte movement is started again.

c. The passages forming between the activated carbon particles (cathode particles) having a diameter of 8 mm have an appropriate size. Applying cathode particles of this size the electrolyte can pass through the cathode material with a speed that is sufficiently high for achieving the required depolarization level. Due to the dimensions of the extruded activated carbon rods (cathode particles) a significantly smaller amount of cathode material can be placed in a given volume (the specific dimension (width) of the passages is much higher, the spaces between the cathode particles are larger), which results in the—significant—reduction of the available specific surface. It is also due to the dimensions—to the width and length of the micro-, meso-, and macro-passages—that the generated gases cannot be removed therefrom with an adequate efficiency by means of the movement of electrolyte. The measurements have confirmed that, in spite that the movement of electrolyte is appropriate, the output power of the cell becomes reduced significantly (usually by 30-40%) within a short period of time, followed by a reduction to zero in the longer run (cf. FIG. 9).

The results measured with activated carbon cathode particles having different geometric configuration but the same precursor are presented in FIGS. 8 and 9. As the primary reasons for the differences, inadequate depolarization and the differences of specific surface resulting from different configurations can be identified. The tests were carried out using a resistive dummy load that in all cases drew a current of 100 mA. The volume of the cathode housing was 63 cm$^3$. The initial voltage was 1.7 VDC with all three types of cathode (extruded activated carbon cathode particles with a diameter of 1, 3, and 8 mm, made from a coconut shell precursor). For the test, a 3 weight % aqueous salt solution was applied as electrolyte (i.e. a saline solution having similar salt content as seawater), in a flow-through regime, circulating the electrolyte at a pressure of 2.5-3 bar.

Further Parameters of the Test Equipment are as Follows:
Outside diameter of cathode housing: 32 mm
Inside diameter of cathode housing: 26 mm
Total length of cathode housing: 80 mm
Separator filter: Reinforced transfer membrane
Volume of cathode housing: 63 cm$^3$
Number of cathode housings: 1
Collector member: 70×8×2 mm pressed graphite plate
Control: Stabilizer electronic device with a voltage of 3.2 VDC Parameters of the Test Environment:
Ambient temperature: 25° C.
Electrolyte temperature: 20° C.
Electrolyte quantity: 1 litre
Salt content: 3 weight %

Experiments were also carried out with further cathode housing dimensions, resulting in the observation that it is expedient to keep the inside diameter of the cathode housing below 200 mm (in principle, the cathode arrangement can operate with cathode housing inside diameter values higher than that); the best results being obtained applying cathode housings having an inside diameter of approx. 60-70 mm and a length approximately twice the inside diameter, i.e. approx. 130 mm. The preferably applied compaction is typically performed by mechanical pressing; in the above example, a load of 25 kg (i.e. such a mass was applied for placing it) was applied to the cover to be closed of the cathode housing (having a surface area of 4.15 cm$^2$); this corresponds to a pressure force of approximately 59 N per cm$^2$.

A number of different experiments were performed. Salt content values (in weight %) were examined from 0.9 weight % to 4 weight %. This is significant because the salinity of North Sea water is only 0.9 weight %. The energy cell according to the invention has excellent performance with all these salt content values. We have started with a salt content of 3-3.5 weight % because 98% of the world's seas and oceans are in this salinity range.

During our experiments the expedient amount of the collector member's extension into the space for cathode material was also tested. The results indicate that the first end part of the collector member should preferably be as close to the side of the cathode housing being opposite thereto as possible. The distance of the first end part of the collector member is preferably not greater than the radius of the cathode housing (with a non-cylindrical cathode housing it should be not greater than the greatest distance between the sides of the cathode housing lying parallel with the longitudinal direction of the collector member and the collector member itself).

Based on the test results it can be determined that the adequate geometric configuration of the material of the cathode electrode (i.e. the placement of cathode particles with adequate dimensions around the collector rod) is of primary importance for the stable and efficient operation of the energy cell made applying the cathode arrangement according to the invention. The application of activated carbon particles of different diameter leads to different observed performance and stability.

Examining the effects of the dimensions of the cathode particles we have established that an adequate operation can be observed in case the diameter of the cathode particles falls in the range between 2 mm and 5 mm. In case cathode particles having a diameter outside this range are applied the output power yielded by such active cathode is significantly lower and is also more unstable (it cannot be maintained for a long period of time, as illustrated by the figures).

Since the successful operation of the cathode arrangement is based on the combined effect of multiple factors, the effects of the different materials and at the same time their geometric configuration have to be examined.

As far as geometric configuration is concerned, in addition to the diameter, the length of the cathode particles also has significance; this parameter can be characterised with the diameter-to-length ratio. The length parameter can be adjusted before the particles are loaded into the cathode housing, because after that the particles can still break in pieces under the effect of the preferably applied compaction with a pressure force. We have found that during compaction the particles undergo 'cubing' or 'sphering' to a certain extent, by which it is meant that their diameter-to-length ratio becomes closer to 1:1. Due to their geometry, cylindric particles are typically prone to break along their cross section perpendicular to the longitudinal axis, the cylindric particles thus being resistant to breaking in a longitudinal-axis direction. Thereby, longer particles may get broken down into multiple shorter particles. Particles with a diameter-to-length ratio near 1:1, however, become resistant to further breakings; for further breaking such amounts of force would be needed which are not present in the system of particles even during the compaction operation. Activated carbon made from a precursor selected as described below has a very high strength anyway, so breakings do not occur frequently. Particles with parameters below the diameter-to-length ratio 1:1 (i.e. with a length smaller than the diameter) may occur even before, and also after the compaction operation, but their occurrence is not typical.

In accordance with the above, based on the tests we have come to the conclusion that it is preferable to apply such cathode particles to be fed into the cathode housing which have a typical diameter-to-length ratio range of 1:1-1:3. By the cathode particles having a typical diameter-to-length ratio range of 1:1-1:3 it is meant that this ratio holds for most of the cathode particles (more than 90%).

The lower limit value is a natural limit determined by the breaking phenomena sketched above. The application of cathode particles with a diameter-to-length ratio of approx. 1:1 (that is, from 1:1 to a bit higher ratio, up to 1:3) is advantageous also because with a too high number of particles shorter than that the dimensions of the passages (their width) would be too low (the particles could form a more ordered pattern coming closer to one another), which would negatively affect operation since depolarization is blocked with passages of too small dimensions. Due to the random pattern assumed by the cathode particles, the passages have a random configuration, so there are no concrete parameters that could describe their shape or dimensions. Accordingly, the width dimensions of the passages vary along their length. Therefore the passages can only be characterised by a characteristic dimension, which essentially corresponds to an average width. This characteristic dimension is essentially an average calculated for the entire aggregation of particles; an approximate estimate for the characteristic dimension can be made for given diameter and length values.

During extrusion the rod-shaped extruded material comes out of the extrusion apparatus continuously. This naturally falls into pieces—typically already during extrusion, and also during the subsequent activation process—such that the diameter-to-length ratio typically—for most of the particles—falls in the range of 1:1-1:3. Extrusion is an intermediate step of the manufacturing process. The final geometric shape and the physical characteristics are obtained at the very end of the manufacturing process, after activation involving also heating and preferably the application of a gas mixture of water vapour and $CO_2$.

The concept of characteristic dimension can be understood based on FIGS. 7A to 7E, where sectional views illustrate the passages that are formed between the cylindric particles. In these figures it can be also observed that the smaller-sized particles (see particularly FIG. 7A) can agglomerate to a high extent, leaving space only for passages with very small characteristic dimensions. Particles that are shorter than what is allowed by the 1:1 ratio are also shown in the figures, but in reality it is not typical for particles to get fragmented to such a size, in this respect, FIGS. 7A to 7E are illustrative only. From the aspect of this invention, therefore, the characteristic dimension of the passages relative to the size of the particles is what bears significance, since it statistically determines the efficiency with which the electrolyte can pass between the cathode particles through the passages.

The preferably applicable upper length limit of the cathode particles is determined by the fact that it is not expedient to apply too long particles in the initial material since it would lead to way too many breaking or fragmenting 'events' during compaction (overly long particles have low strength and thus easily breaks or become crumbled), which would result in an undesirable amount of fragmented material. If overly long particles are applied, the cathode particles become arranged relatively loosely even after compaction by a pressure force, and thereby their surface area in contact is also reduced or even completely eliminated. This phenomenon leads to the drastic reduction of output power.

Breakings (cracks) running perpendicular to the longitudinal directions—if only to a small extent—also produce fragments, which may also block some of the passages, so an excess amount of fragments can have a negative effect. Cathode particles in the approximate diameter-to-length ratio range of 1:1 and 1:3 are preferably applied in order to avoid that. Our experiments show that in case such particles are applied, fragmenting remains so low that it has no significant consequences. In specific cases the particles are washed thoroughly in hot water before they are used in order to remove from them the tiny fragments and dust formed during the production process. Hot water is required in order that the particles can be dried under heat rapidly after they are washed. Compaction of the particles is preferably carried out and the particles can be put to use only in a completely dry state.

The experiments illustrated in the graphs of FIGS. 8 and 9 were therefore carried out applying extruded activated carbon cathode particles with diameter values of 1, 3 and 8 mm (FIG. 8 shows the results shown in FIG. 9 for the time period immediately following the beginning of the experiment). The experiments were carried out for 24 hours applying a static load and a steady electrolyte exchange. Over the first 30 minutes, without load and with a steady electrolyte replacement flow, a small decrease in electrode potential values was recorded (during this period the most favourable results were recorded in the experiment performed with cathode particles corresponding to the 3 mm diameter, i.e. in that one with cathode particles according to the invention). After switching on the load, an immediate and continuous fall of the voltage level was measured with the 1-mm and 8-mm diameter cathode particles. With the 1-mm diameter and 8-mm diameter cathode particles, respectively, the voltage levels have fallen to 0V by the 180th and 330th minute of the measurements.

The reason for the fall of the voltage level, and thus of cell power, is inadequate depolarization for both 1-mm diameter and 8-mm diameter particles, but the root causes are different. In the case of 1-mm diameter cathode particles, due to the narrow passages hydrogen builds up between the particles and covers them. Thereby it blocks the movement of electrons. On the other hand, in case of the 8-mm diameter cathode particles the meso-, macro-, and micro-passages formed during the activation process are wider and longer due to the overly large diameter. Thereby the flowing electrolyte cannot remove hydrogen gas generated in the overly long passages, which results in a reduction of specific surface, and thus, of the power.

With the cathode particles having a diameter of 3 mm, the voltage level fell to 1.45V after the load has been switched on, but it stayed stably between 1.44V and 1.46V during the whole course of the measurements, as shown in FIG. 9. Provided that the steady movement of electrolyte is maintained, no change of the voltage values is expected even after the 24-hour test period.

As it was mentioned above, passages are formed between the extruded activated carbon particles (cathode particles) arranged in an unordered manner. Activated carbon particles with different size also have differently sized passages between them. The dimensions of the passages between smaller-sized carbon particles are significantly lower than the dimensions forming between larger-sized carbon particles. The width of the passages formed between the extruded particles under investigation is typically between 1% and 60% of the diameter of the particle. Thereby, with a given particle diameter the width of the passages typically falls in the ranges included in the table below:

TABLE 1

| Width of passages formed between particles | | |
|---|---|---|
| Particle diameter | Smallest size | Largest size |
| 1 mm Ø | 10 µm | 600 µm |
| 2 mm Ø | 20 µm | 1200 µm |
| 3 mm Ø | 30 µm | 1800 µm |
| 4 mm Ø | 40 µm | 2400 µm |
| 5 mm Ø | 50 µm | 3000 µm |

The dimensions of the passages formed between the tested extruded carbon particles with a diameter of 1 mm are reduced to a high extent during the compaction of the cathode particles by pressing (this is consistent with the observation that small particles can become ordered in an effective manner; while for larger particles the pattern, already random at the beginning, prevents self-ordering to a larger extent, as there is a higher chance for the particles to be situated transversely with respect to one another or to be pressed against one another in a way that prevents the formation of an ordered pattern). Thereby, in the case of a diameter of 1 mm the movement of electrolyte is severely restricted, and thus the electrolyte is no longer capable of separating and driving off the hydrogen bubbles forming over the surface of the particles. The size of the passages formed between activated carbon particles in the diameter range of 2-5 mm is appropriate for ensuring the movement of the electrolyte (as it will be detailed below referring to Table 2).

Another factor that affects the applicable particle diameter range is the matrix structure of activated carbon formed during production. The basic structural unit (BSU) consists of a few polyaromatic molecules (platelet-like layers). The complex structure of activated carbon is generated by the unordered arrangement of these layers within the cathode particles produced by extrusion. As a result of this, a complicated system of macro-, meso-, and micro-pores is formed over the entire internal structure of activated carbon. These pores are completely filled by the electrolyte, the reduction reaction thereby resulting in hydrogen production. The hydrogen micro-bubbles thus generated fill the passages, blocking the way of the electrolyte, which results in the polarization of the regions covered with hydrogen. During forced depolarization the suction effect and the effect of the electrolyte's movement are only capable of separating the hydrogen micro-bubbles from the outside surface of the activated carbon material and the pores directly connected thereto. The pores situated inside the activated carbon particles remain constantly saturated with hydrogen, which results in a large-scale reduction of the reacting specific surface of activated carbon in case there are overly long and deep interior passages in the cathode particles.

It follows from this that the greater the diameter of the activated carbon particles the larger the non-depolarizable surface area establishes during hydrogen production (and thus the output power decreases constantly), the specific surface loss increasing in direct proportion to that. In addition to that, of such particles that have greater geometric dimensions a lot fewer can be loaded into a given volume compared to activated carbon particles with smaller geometric dimensions. In case the particles have an overly large diameter, the part of the filled-in volume taken up by the passages will be too large compared to the part filled by the material of the cathode particles (the useful material). With the application of overly large-diameter cathode particles these factors may even lead to the system of cathode particles being completely unsuitable and unstable, as can be seen in FIG. 9 for the diameter value of 8 mm.

To sum up the above, the appropriate dimension range of extruded activated carbon particles applicable in active cathode cells is determined by the following three major factors:

1. The dimensions of the passages formed between particles.
2. The non-depolarizable surface area.
3. The quantity of cathode particles that can be placed in the same spatial region determined by geometric dimensions.

TABLE 2

Comparison of the characteristics of extruded activated carbon particles of different geometric dimensions

| Definition | 1 mm Ø | 2 mm Ø | 3 mm Ø | 4 mm Ø | 5 mm Ø | 6 mm Ø | 7 mm Ø | 8 mm Ø |
| --- | --- | --- | --- | --- | --- | --- | --- | --- |
| Size of passages between particles | Minimal | Medium | Optimal | Optimal | Optimal | Optimal | High | High |
| Surface loss due to non-depolarizable surface area | Minimal | Low | Optimal | Optimal | Medium | High | Very high | Very high |
| Surface loss due to geometry | Minimal | Low | Optimal | Optimal | Medium | Medium | Very high | Very high |
| Applicability | NO | YES | YES | YES | YES | NO | NO | NO |

The following conclusions can be drawn from Table 2: The first row of definitions relates to the size of the passages forming between the particles. As it was detailed above, with cathode particles having a diameter of 1 mm, the size of these passages—taking into account the entire cathode particle aggregation—is not sufficiently large for the efficient movement of the electrolyte through them that would be required for depolarization. The term 'minimal' included in the table for the diameter value of 1 mm indicates that the size of the passages is not sufficient for the stable operation of the energy cell obtained with given cathode arrangement. With a cathode material constituted by cathode particles having a diameter of 2 mm the passages are larger-sized compared to the diameter value of 1 mm, which is reflected in the table by the adjective 'medium'. The experiments have indicated that utilizing the cathode arrangement applying the particles with a diameter of 2 mm an energy cell capable of stable operation can be obtained.

In the case of the application of powders, granulated materials and overly small-sized extruded rods (approximate diameter: 1 mm), because of the size differences between the passage formed between the particles the 'labyrinth seal' principle will apply during pressurized electrolyte exchange. The essential feature of a labyrinth seal is that a pressurized liquid flows from a smaller volume to a larger one, then from the larger volume to a smaller one, followed by that it is once again forced into a larger volume, and so on. This cyclic change of the volumes receiving the liquid causes it to lose its pressure and velocity until both parameters fall to zero. Due to this phenomenon, as the movement of the electrolyte ceases, depolarization also stops. In the case of powders, granulated materials, and overly small-sized extruded rods (approximate diameter: 1 mm) in free-flow systems the movement of water is not sufficient for providing electrolyte exchange in the interior volumes (the gas bubbles causing polarization can get stuck at several locations such that they cannot be driven off by the free-flow electrolyte). In this situation this is the reason why depolarization does not occur.

According to our experiments, with a diameter of 3 mm the size of the passages between the particles are optimal, i.e. the passages allow the flow of electrolyte in a fully appropriate manner. Above a diameter of 3 mm the size of the passages becomes acceptable in all cases from the aspect of the electrolyte flow. In the case of diameter values of 7 and 8 mm the term 'high' is included in the row of Table 2 related to the dimensions of the passages, which indicates that the size of the passages forming with such a diameter value is already too high (large), and the application of such particles is not expedient due to too large volume fraction taken up by the passages.

The next row of Table 2 relates to surface area loss due to non-depolarizable surface. This type of surface area loss presents itself especially with large diameter values (above 6 mm). In the case of small diameters, such as a diameter of 1 mm, the surface area loss resulting from the internal passages situated inside the cathode particles is minimal, since these passages are so small-sized and not deep that hydrogen bubbles can be driven off from them (do not become stuck therein). The experiments have shown that with a diameter of 5 mm there is already a small amount of surface area loss due to non-depolarizable surface, but this does not affect the operational stability of the energy cell. However, with a diameter of 6 mm an already high amount of surface area loss occurs, resulting in that the output voltage cannot be maintained in a stable manner over a long period of time. In the case of diameter values of 7 mm and above the surface area loss due to non-depolarizable surface are very high. As it is shown by the curve corresponding to the diameter value of 8 mm, with such diameters the output voltage cannot be maintained in a stable manner.

The next row of Table 2 relates to surface area losses due to geometric dimensions. This parameter describes how economical it is to operate the energy cell with the particular geometric dimensions, and also whether the cell can have a specific surface that allows for the sustained, stable operation of the cell. For smaller diameter values such as 1 mm the surface area losses due to geometric dimensions are not relevant as cathode particles of such a diameter can be efficiently placed into the cathode housing. According to our experiments this type of loss remains low in case particles with a diameter of 2 mm are applied, while it is optimal with the diameter values of 3 mm and 4 mm. In the case of the application of particles with a diameter of 5 mm a medium loss of specific surface occurs, but according to our experiments with such a diameter the output power can still be kept stable. However, with a diameter value of 6 mm the reduction of specific surface due to the overly large geometric dimensions already hinders the efficient operation of the energy cell with such a cathode arrangement. This is especially true for the application of particles having a diameter larger than 7 mm.

The last row of Table 2 summarizes the results taking into account the different aspects, i.e. it characterizes the applicability of the particles with the given geometric dimensions. Cathode particles having a diameter of 1 mm cannot be successfully applied because the size of passages between the particles is too low for the electrolyte to flow through them with the required efficiency, so depolarization cannot be carried out adequately. In the case of particles with a diameter of 2 mm this obstacle is removed, and, although the parameters are not yet optimal, the energy cell obtained with cathode particles of this size is capable of stable operation. According to our experiments, in the case of applying cathode particles with a diameter between 3 and 4 mm all tested parameters are optimal, and thus the cathode arrangement according to the invention can be realized most advantageously applying cathode particles with such diameter values. With the diameter value of 5 mm some parameters are already out of the optimal range, but a long, stable operation can still be provided. In the case of the diameter value of 6 mm—similarly to cathode particles with larger diameter, as with cathode particles with a diameter larger than that, a long, stable operation cannot be maintained due to the overly high surface area losses due to non-depolarizable surface and geometric dimensions.

To sum up the above, to ensure the adequate operation of the cathode arrangement according to the invention, cathode particles with a diameter between 2 and 5 mm, and preferably between 3 and 4 mm are applied.

The material of the cathode particles must possess the following important characteristics:
It must not have any harmful effects on the environment,
Good electric conductivity,
High specific strength,
Very high specific surface,
Adequate geometric configuration.

Of the carbon materials tested, it is the activated carbon which fulfils the most requirements. Activated carbon exists in many different geometric forms. It is available in powdered form and also as a granulated material having different particle sizes, and can be processed by the help of extrusion. Since it is a naturally occurring material, its application as cathode material has no harmful effects on the environment. Regardless of their precursor, activated carbon materials have excellent electrical conductivity.

Our experiments carried out for selecting the precursor material are described below. Activated carbon materials having different precursors have different physical characteristics. Our experiments also included tests measuring how well the cathode particles withstand the forces present during the compaction process (typically, compaction through pressing) that is preferably applied during the manufacturing of the cathode arrangement. This characteristics is of major importance as contact between the particles can be maintained after the cathode is submerged into the electrolyte only by compaction. The upper limit of the compaction pressure force applied during pressing is determined by the breaking or crumbling of the particles (the limit values have to be chosen such that breaking or crumbling cannot occur). Our measurement results are summarized in Table 3 below.

TABLE 3

| Precursor | Type | Electrode potential | Limit of squeezing pressure force |
|---|---|---|---|
| Wood | Granulated material | 1.45 V | 42.5N per cm$^2$ (18 kg for 4.15 cm$^2$) |

TABLE 3-continued

| Precursor | Type | Electrode potential | Limit of squeezing pressure force |
|---|---|---|---|
| Wood | Extruded | 1.45 V | 49.6N per cm$^2$ (21 kg for 4.15 cm$^2$) |
| Wood, impregnated with silver | Extruded | 1.19 V | 59N per cm$^2$ (25 kg for 4.15 cm$^2$) |
| Peat | Granulated material | 1.2 V | 52N per cm$^2$ (22 kg for 4.15 cm$^2$) |

TABLE 3-continued

| Precursor | Type | Electrode potential | Limit of squeezing pressure force |
|---|---|---|---|
| Coconut shell | Granulated material | 1.7 V | 52N per cm$^2$ (22 kg for 4.15 cm$^2$) |
| Coconut shell | Extruded | 1.7 V | 70.9N per cm$^2$ (30 kg for 4.15 cm$^2$) |

Based on the results included in Table 3 the following conclusions can be drawn: For the measurements included in the table, extruded cathode particles having a diameter of 3 mm were applied. The particle size of the applied granulated material is approximately 2-3 mm but this value has a high deviation because the particles get crumbled easily. The different load bearing capacity of a granulated material and an extruded cylindric shape made from the same precursor is explained below. The pieces of a granulated material have an irregular surface, and so they are easily broken or crumbled when subjected to external mechanical forces. In contrast to that, extruded particles have a regular rod shape (cylindric shape), which is much more resistant due its cylindric configuration.

The table includes results obtained with cathode materials both in the form of granulated material and in an extruded form. As shown in the table, electrode potential is independent from that, i.e. it is determined solely by the material quality of the precursor (for the two wooden materials it is 1.45 V, while in the case of coconut shell it is 1.7 V). Due to their different physical forms and shapes, the limit values of the compaction pressure force are different for these materials. As shown in Table 3, extruded particles can be subjected to greater loads in all cases (without causing the particles to degrade) compared with granulated materials having the same precursor. This result confirms that it is preferable to apply extruded cathode particles. In the case of the particularly preferably applied coconut shell precursor the load limit is almost one and a half times greater compared with the granulated material, i.e. the extruded material has outstanding load bearing capacity, and can be compacted much better compared with the granulated material.

Also, in comparison to other precursors, in the case of the preferably applicable coconut shell (exemplifying hard-shell fruits), an outstanding electrode potential value of 1.7 V can be measured, which greatly exceeds the electrode potential values that can be achieved applying wood or peat precursor materials. Values similar to those of coconut shell can be measured with other hard-shell fruits and hard-shell seeds of fruits due to their closely similar material structural characteristics.

Comparing the composition of activated carbon materials made from different precursors (Table 4) it is also clearly seen that activated carbon materials made from coconut shell and from hard-shell seeds of fruits as precursors possess the most favourable characteristics.

TABLE 4

| Precursor | Iodine number | Hardness | Ash content | Moisture content |
|---|---|---|---|---|
| Coconut shell and fibre | 950 ± 50 mg/g | 94% min. | 2 weight % max. | 5 weight % max. |
| Hard-shell seeds of fruits | 950 ± 50 mg/g | 94% min. | 2-3 weight % max. | 5 weight % max. |
| Briquetted activated carbon materials | 950-1150 mg/g | 90% min. | 5-15 weight % max. | 5 weight % max. |

As shown in Table 4, coconut shell and fibres, as well as hard-shell seeds of fruits have outstanding hardness, which is advantageous because of the compaction they are preferably subjected to in the application according to the invention. In addition to that, these materials have exceptionally low ash content, which is advantageous because an overly high ash content reduces the electric performance of the given material.

A significant sign of environmental pollution is the reduction of the pH values of seas and oceans, i.e. the acidification of seawater, which strongly affects marine food chains and the change of the temperature of the environment. Due to their ash content, activated carbon materials have a mild alkalizing effect (pH 7-7.5) on liquids (because the ash content is low). With regard to this characteristics, during operation the activated carbon (the material of the cathode electrode) alkalizes seawater, thereby having a beneficial influence of the ecosystems present in its environment.

Based on the above described experiments, hard-shell fruits or the hard-shell seeds of fruits (coconut shell, apricot kernels, etc.) can be most preferably applied as precursor for the purposes of the invention, i.e. the cathode particles applied according to the invention can be preferably made by extruding activated carbon made from such precursors because cathode materials of such precursors have appropriate specific strength.

In these embodiments, therefore, the carbon precursor utilized for extruding the cathode particles is from hard-shell fruits or the hard-shell seeds of fruits. High specific strength can be necessitated by the high-pressure force compaction process optionally applied during the production of the cathode arrangement according to the invention. Independent of their precursor, all types of activated carbon have very high specific surface due to the unevenness of their surface and the micro-, meso-, and macro-pores produced on their surface during activation. The specific surface (per gram) varies between 400-1600 m$^2$ depending on the type of activated carbon. The activated carbon material preferably applicable in the cathode arrangement according to the invention, made applying coconut shell, other hard-shell fruits and hard-shell seeds of fruits as precursors, has a specific surface of 950-1050 m$^2$/g. The value of the output energy and output current, i.e. the output power of the energy cell obtained applying the cathode arrangement, are determined by the total specific surface of the cathode material.

By selecting the geometric configuration (cylindric shape, diameter of 2-5 mm) and the precursor, such a material was produced that fulfils all the above described objectives. Thanks to the fact that they are introduced into the cathode housing in bulk and also to their geometric configuration the activated carbon particles assume an unordered pattern in the cathode arrangement according to the invention, and thus the passages formed between the particles have a size (in the diameter range of 2-5 mm) that is appropriate for the removal of gases separated during depolarization. By selecting the adequate precursor (hard-shell fruits or hard-shell seeds of fruits) of the activated carbon material it is provided that the material has sufficient strength for preventing the particles—or at least most of them—from getting broken or deformed during the compaction process preferably applied according to the invention, and thereby that the permanent electric contact is maintained continuously. The activated carbon cathode's electrode potential is stable at 1.7 V.

The material of the cathode particles is therefore activated carbon obtained from plant material by carbonization and subsequent activation at a temperature of 700-1000° C. with a gas mixture. Activation is carried out by heating in an atmosphere formed by a mixture of water vapour and $CO_2$. It is during this process that the system of passages is formed on the surface and in the interior of the particles, the material obtaining its final hardness and other physical characteristics also at this time.

During compaction by pressing, the activated carbon cathode particles are subjected to very high physical impact. Our experiments have shown that during the compaction process generic activated carbon particles made from usual charcoal are prone to get broken and crumbled, and thereby become unsuitable for application in the cathode arrangement according to the invention. In order to prevent that, an activated carbon material can be produced, preferably by utilizing the appropriate precursor (hard-shell fruits and hard-shell seeds of fruits), that possesses excellent physical characteristics and sufficiently stable structure for application in the cathode arrangement according to the invention.

For selecting the anode material, different alkaline earth metals have been examined:
aluminium and its various alloys,
zinc and its various alloys,
magnesium and its various alloys, This development is based on a series of experiments and measurements carried out to determine the composition of the metal to be applied, as well as that of its alloys. The tests were primarily performed on materials that are easily available commercially and can be applied in an economical manner. After concluding the series of tests it was made clear that the anode material that is the most suitable for power generation in combination with the cathode arrangement according to the invention is the material named AZ63, specified also in other approaches.

The advantages of such an anode, comprising predominantly magnesium are:
a. It has high electric potential compared to other metals.
b. It has no harmful effect on the environment and life.
c. It is the 8th most frequent metal.
d. It is easily available commercially.
e. It has a favourable purchase price.

The configuration of the energy cell made applying the cathode arrangement according to the invention is based on the principle of the galvanic cell. The essence of the principle is that due to the difference between the anode and cathode potentials—depending on the material of the electrolyte—low-power electricity can be generated from the electrolyte solution. Consequently, the cathode arrangement according to the invention can generate electric power utilizing any such metal that has different electric potential from the electric potential of the cathode arrangement. Different metals have different electric potentials, and thus are applicable for generating different electric power levels in combination with the cathode arrangement.

During the series of tests and measurements, in combination with the cathode arrangement according to the invention the best results have been recorded typically with the two magnesium alloys specified below.

They are the magnesium alloys specified according to the standards AZ31 and AZ63, and contain the alloying materials included in Table 5 below.

TABLE 5

| | AZ31 | | AZ63 | |
|---|---|---|---|---|
| Material | weight % Min. | weight % Max. | weight % Min. | weight % Max. |
| Al | 2.5 | 3.5 | 5.8 | 7.2 |
| Zn | 0.6 | 1.4 | 2.7 | 3.3 |
| Pb | — | — | — | — |
| Tl | — | — | — | — |
| Mn | 0.15 | 0.7 | 0.15 | 0.25 |
| Si | — | 0.1 | — | 0.05 |
| Ca | — | 0.04 | — | 0.3 |
| Cu | — | 0.05 | 0.05 | 0.05 |
| Ni | — | 0.005 | — | 0.005 |
| Fe | — | 0.006 | — | 0.006 |

The alloy that is the most stable and which can be applied with the lowest amount of precipitate forming is AZ63.

Major physical characteristics of the alloy $MgAl_6Zn_3$ (AZ63):
specific weight: 1.79 kg/dm$^3$
electric conductivity: 8.2 m/ohm/mm$^2$
linear thermal expansion coefficient: 26 μm/m° C.
melting range: 455-610° C.
thermal conductivity: 0.2 cal/cm ° C.
specific heat capacity: 0.25 cal/g
Easily workable The electric potential of the cathode arrangement according to the invention and the AZ63 anode is stable at 1.7 V (without load). At the anode side (negative pole) magnesium oxide is produced during the oxidation reaction, and, becoming in contact with water it is transformed into a common compound forming a precipitate, magnesium hydroxide. During the reaction hydrogen ($H_2$) is produced.

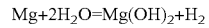

$Mg+2H_2O=Mg(OH)_2+H_2$

Like hydrogen gas, magnesium hydroxide is removed from the system also by means of the continuous exchange of the electrolyte.

Corresponding to the anode material, the material of the collector is also carbon-based. Based on our experiments, the material of the collector is preferably a graphite plate pressed under a high pressure force, made from high-purity (99.5% m/m) graphite and having a particular particle size of approximately 3-5 μm (the thickness of the collector is, by way of example, 2-5 mm). In an embodiment, therefore, the collector member is made by pressing from high-purity graphite.

Collectors made of such material have excellent electrical conductivity and a mechanical strength that is sufficient for application in the active cathode. This plate is made by pressing from graphite powder and, unlike the extruded cathode particles, it does not possess internal passages. The internal structure of the collector (brought about by its special manufacturing process) enables it to withstand high external pressure, even as high as 500 bar that occurs during deep-sea applications, and thereby makes the cathode arrangement according to the invention suitable for deep-sea applications.

The collector can therefore have a plate-like configuration in case the cathode housing is rectangular block-shaped. In case the cathode housing is cylindrical, the collector may have a cylindrical or square-block shape.

The introduction of the collector into the constant-pressure (1 bar, atmospheric pressure) spatial region containing the electronics can be configured in a particularly preferred manner. The constant-pressure and variable-pressure volumes have to be insulated from one another such that the electrolyte cannot enter the constant-pressure volume when subjected to rising ambient pressure. For providing insulation withstanding high pressure differences special synthetic resins have been developed and applied for decades in deep sea exploration technology.

The experiments have confirmed that graphite plates insulated with synthetic resin can withstand only lower pressure differences (1-2 bar). The reason for that is that there remain micro-capillary passages at the joining of the graphite particles and the synthetic resin, which the electrolyte can penetrate driven by the pressure difference. This may cause the electronics to malfunction. To avoid this phenomenon, the part of the collector that is embedded in the synthetic resin insulation is coated with a preferably high-purity (99.99 weight %) silver coating (with a thickness of 2-15 µm) applying an electroplating process. During electroplating silver completely fills up the surface irregularities of the graphite, sealing off the capillary passages. The synthetic resin adheres to silver excellently, and thus the insulation with the desired characteristics can be realized. Moreover, electric wires can easily be soldered to the silver layer, solving the problem of providing an electric contact.

There are two major reasons for providing insulation—as shown in FIGS. 1 and 2, FIG. 3 or FIG. 4—between the constant-pressure and variable-pressure volumes:

1. For the stable, continuous operation of the control electronic device arranged in the constant-pressure volume it is required that a constant atmospheric pressure (1 bar) is maintained. The integrated circuits (ICs) and other components to be built into the electronics unit react very sensitively to pressure changes, including both pressure increases and falls. Drastic pressure changes may cause malfunctions, or in certain cases even a total failure of the electronics.
2. According to the above, another important reason for providing the insulation is that the electronics must not come into contact with the electrolyte, since in that case the galvanization brought about in the electronics unit would cause the permanent failure of the circuit.

The configuration of the pressure housing varies according to the operating environment. In a relatively low-pressure environment (with a pressure around 10 bar) the synthetic resin insulation covers and completely surrounds the collector, as it was explained above in relation to FIG. 3.

In an environment with a pressure higher than that the synthetic resin insulation can preferably fill the entire volume of the pressure-retaining housing (control housing), and thereby also the control electronic device is fully surrounded by the synthetic resin insulation (see FIG. 4). Thus, the control electronic device will not be sensitive to high pressures.

During operation in a seawater environment, floating contaminants and microorganisms may enter the cathode material and settle therein, causing the reduction of the surface area of the cathode's activated carbon material, which may lead to a reduction of the performance of the cathode. The process may lead to the terminal failure of the active cathode.

In order to prevent that a—preferably silicone-free—transfer membrane can be applied between the cathode material and the electrolyte. The water permeability of the membrane is sufficiently high for providing a constant incoming electrolyte flow to the cathode arrangement, yet it prevents harmful substances form entering the interior of the cathode housing. This separator may e.g. be a reinforced NEC (Cellulose Nitrate Transfer membrane), having a pore size of 4-5 µm.

It has been confirmed by the research that the level of power generated from seawater by the cathode arrangement according to the invention may change due to changes in the operating environment. Such changes may be the variation of sea salinity, changes of ambient temperature, or the presence of various contaminants in seawater. Changes of the power level of the cathode arrangement can also be caused by the changing power demand of the utilization circuit. In specific cases the variation of the electric power generated may make doubtful the applicability of the cathode arrangement according to the invention.

In order to prevent that, a so-called stabilizer electronic device is applied in the cathode arrangement according to the invention that is adapted for generating an elevated and stable output voltage under variable conditions. The stabilizer electronic device is an oscillator circuit designed to match the output power of the cathode arrangement.

According to the known approaches, multiple energy cells operating in seawater cannot be applied in interconnection because the anode—the negative pole—is common for all cathode cells, and also because seawater (the electrolyte) is also common for all cathode cells. These characteristics make it impossible to connect known energy cells in series for providing a sufficiently high voltage level. In onshore systems this is circumvented by arranging the individual cells in a physically separated manner, which allows for both the series and the parallel connection of the cells. Our research results have confirmed that in the case of operation in seawater physical separation is not feasible.

To solve this problem, a multifunction isolator converter electronic device comprising a transformer (preferably, micro-transformer), configured as described below, can be applied. The primary result of the application of the isolator converter is that it allows for a so-called ground-independent circuit applicable for operating each instances of the cathode arrangement according to the invention as a stand-alone, isolated power source. The application of the isolator converter described below allows for the series and parallel connection of the cathode cells operating with the common negative pole and in a common electrolyte (seawater). Another function performed by the isolator converter is that it performs voltage step-up. During our research we typically applied two isolator converters having different voltage and power.

5 V—2 W
12 V—2 W

For these reasons, particularly in applications with variable environmental conditions, and wherein the series connection of multiple energy cells is required, control electronic device (a stabilizer electronic device and an isolator converter) can be applied in a particularly preferred manner. There is currently no known commercially available or industrially applied electronics which could be applied for operating the cathode arrangement according to the invention. There is current industrial demand primarily for transforming and stabilizing higher voltage and current levels to lower voltage and current levels. For the operation of these circuits a significantly higher power is required than the power that can be produced by a single cathode arrangement according to the invention.

With ongoing technological progress batteries having lower and lower size and increasing power capacity are introduced to the market. These batteries are typically physically separated power sources, and thereby they can be connected in series or in parallel as required for achieving the desired power level.

A very important difference between batteries and active cathode cells (such as the energy cell made with the cathode arrangement according to the invention) is that batteries store electric energy loaded into them from an external source. In contrast to that, active cathode cells generate electric power themselves, their electric power output being instantly usable. Active cathodes have significantly lower instantaneous power than batteries.

To provide for an appropriate operation—especially due to the low power level and the potentially sub-optimal (variable) operating environment—it is preferred to equip each active cathode cell (energy cell having the cathode arrangement according to the invention) with dedicated control means. In contrast to batteries, active cathode cells operate with a common negative pole and in a common electrolyte. They can only be connected in series or in parallel in case each active cathode cell operates as an independent power source. To provide that, we have developed a control microelectronics circuit adapted for isolating the active cathode cells from one another at a stable, elevated voltage level. By the development of the control microelectronics circuit the series connection of the active cathode cells have been made possible, and thereby made feasible the generation of high-power electricity from seawater.

FIG. 10 illustrates an energy generation apparatus comprising a series-connection arrangement of the common-anode energy cells 76 according to the invention. The energy cells 76 and anodes 74 are arranged in a housing 66. According to FIG. 10 the electrolyte can be circulated in the energy cells 76 by means of a pump. The electrolyte can be introduced into the housing 66 through an electrolyte inlet 68. The interior of the housing 66 has to be filled with electrolyte such that the electrolyte penetrates into the cathode arrangements of the energy cells 76 and covers the anodes 74 too. In a flow-through scheme, the electrolyte is discharged through an electrolyte outlet 70, the hydrogen produced during the reaction being discharged through a hydrogen gas outlet 72.

Each energy cell 76 shown in FIG. 10 is equipped with a stabilizer electronic device and an isolator converter. Thereby, their positive and $V_0$ poles are ground-independent, while their negative poles are connected to the anode in a manner illustrated in the figure. A 25V DC output (obtainable, according to the example, utilizing five 5V, 2 W energy cells 76 due to the application of the appropriate control electronic device) is also shown in the figure, which output has a corresponding $V_0$ pole (at the top of the figure). This ground-independent $V_0$ pole is connected to the $V_0$ pole of the rightmost energy cell 76, while the 25V output is connected to the positive pole of the leftmost energy cell 76. Due to the series connection, going from left to right, the $V_0$ pole of the left-side energy cell 76 is connected to the positive pole of the right-adjacent energy cell.

Figure 12:
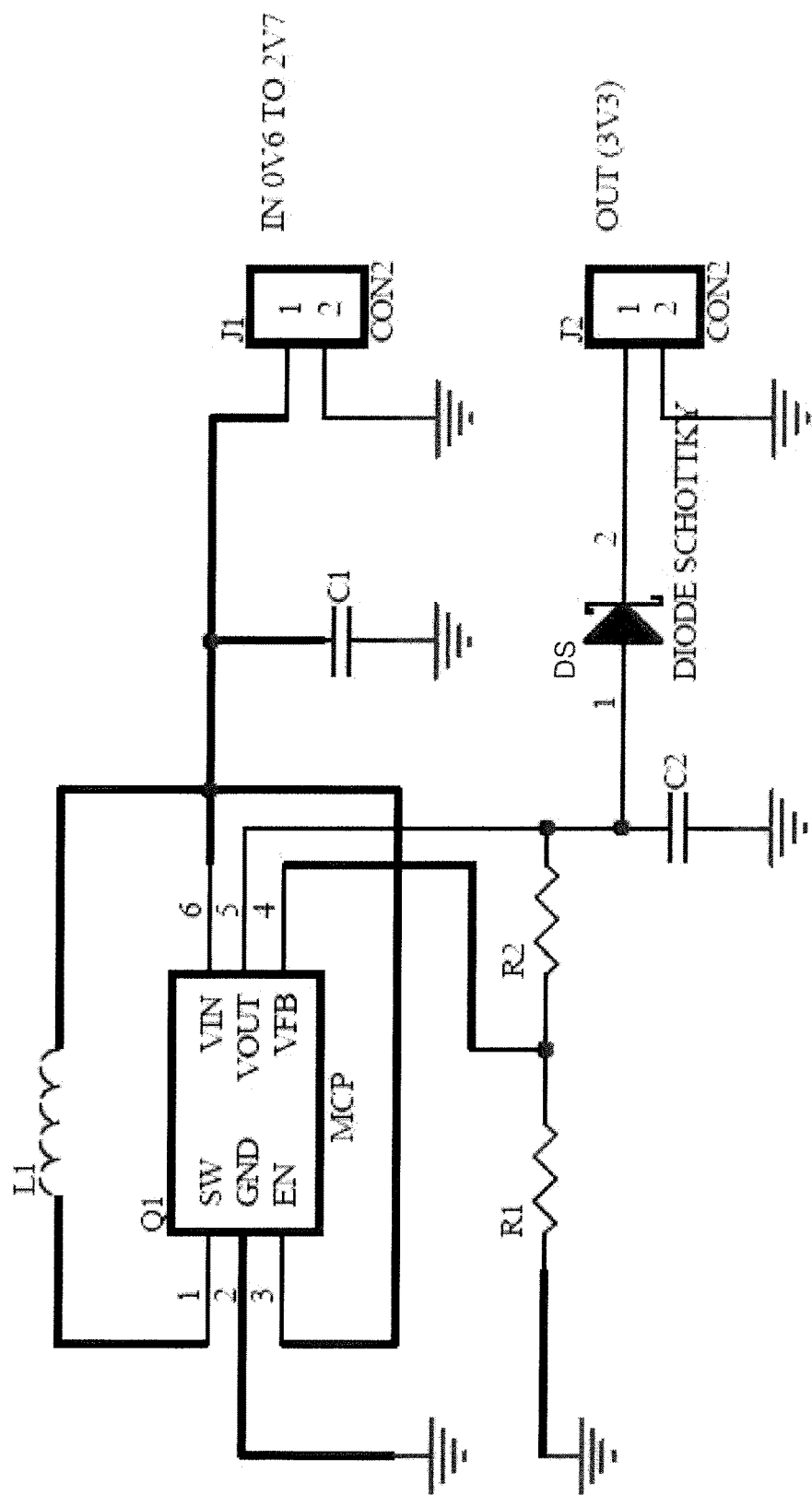
FIG. 12 is a circuit diagram illustrating the configuration of the stabilizer electronic device.

In an embodiment the energy cell according to the invention comprises a stabilizer electronic device adapted for stabilizing the output voltage of the energy cell, the stabilizer electronic device is connected to the second end part of the collector member and to the anode, and comprises a voltage step-up circuit series-connected to an oscillator coil, the stabilizer electronic device further have, at its output, a resistor divider and a rectifier element adapted for protection against back-current. The circuit diagram of such a stabilizer electronic device is illustrated in FIG. 12. In this exemplary circuit diagram the input (between 0.6 V and 2.7 V) and the output (3.3 V) are shown on the right.

The function performed by the stabilizer electronic device in the energy cell obtained with the cathode arrangement according to the invention and an anode (the energy cell according to the invention) is to elevate (step up) to a higher voltage value the low voltage produced by the cathode arrangement having an adequate electrolyte supply and the anode. Due to the variability of the operating conditions (ambient temperature, salinity, contaminant content of the electrolyte, etc.) influencing electric power generation from seawater the power generated by the energy cell according to the invention may also vary. Applying the stabilizer electronic device a stable output voltage can be made from the variable input voltage.

The stabilizer electronic device is an oscillator circuit designed to match the power of the active cathode, its circuit diagram is shown in FIG. 12. As shown in the figure, in the illustrated embodiment the parameters of the stabilizer electronic device are the following:

Input voltage minimum: 0.6 V
Input voltage minimum: 2.7 V
Output voltage: 3.2 V or 5 V
Max. current: 550 mA The stabilizer electronic device is a preferably compact, high-efficiency step-up DC-DC converter comprising a fixed-frequency (e.g. 1 kHz) PWM series resonant circuit (oscillator coil: L1, the required frequency is determined by the type of the MCP IC and the application). The individual circuit components of the stabilizer electronic device are configured corresponding to the intended application, the type of the consumer, and energy level requirements, e.g. utilizing a MPC (Micro Chip Power) integrated circuit (it is an embodiment of the voltage step-up circuit, being a controller IC).

Multiple MCP IC-s with different parameters can be applied in the energy cell according to the invention. The primary functionality performed by the MCP IC in the control electronic device is elevating the input voltage (voltage step-up) at the expense of the output current of the energy cell. The MCP IC has a regulated, fixed output voltage of 5.0 V, so the required voltage level can be achieved by adjusting the resistance of the series resistor. Applying a series resistor a stabilizer electronic device having adjustable, regulated output voltage can be provided. The advantage of the stabilizer electronic device is that it is capable of operating with low input voltage levels. Surface mounted devices (SMD) have a limited current pass-through capacity due to their dimensions. In the illustrated embodiment the stabilizer electronic device can provide a maximum output current of 550 mA, independent of the power output of the energy cell. The energy cell should always be dimensioned to correspond to the power rating of the stabilizer electronic device. In the energy cell according to the invention the stabilizer electronic device is preferably applied together with the isolator circuit (forming together the control electronic device). Due to the limitations of the energy cell according to the invention the maximum output power of an energy cell implemented utilizing control electronic device is 2 W. The Schottky diode ensures that there is no back-current flowing into the stabilizer electronic device, i.e. the Schottky diode provides back-current protection for the control electronic device.

In an embodiment of the energy cell according to the invention, therefore, a stabilizer electronic device adapted for stabilizing the output voltage of the energy cell according to the invention is connected to the second end part of the collector member and to the anode, the stabilizer electronic device is provided with a series oscillator circuit and realized by a voltage step-up DC/DC converter circuit.

For supplying power to lower-power utilization circuits (e.g. LEDs) it may become necessary to control the output current in addition to providing a regulated voltage level. To achieve that, a current generator having a limited output current can be implemented using the stabilizer electronic device by providing a resistive divider consisting of the resistors R1 and R2 shown in FIG. 12 (also applicable for adjusting the output voltage level). The parameters of the applied resistors have to be specified in all cases corresponding to the power output of the energy cell and to the parameters of the consumer in order that the utilization circuit can be operated constantly at the voltage and current levels required for its normal operation. The modification of any of these parameters may cause the consumer to malfunction. The value of the required resistance is determined as $$R = \frac{U}{I},$$

the power of the resistor being $$P = \frac{U^2}{R}.$$

The current that is increased due to the parallel connection of the stabilizer electronic device should not exceed the current value determined by the capacity of the built-in MCP controller IC, because otherwise the protection system of the IC would immediately disable the operation of the circuit. Taking that into account, it is only possible to connect the energy cells equipped with stabilizer electronic devices in a series connection.

The efficiency factor of the stabilizer electronic device is <85%.

Figure 11:
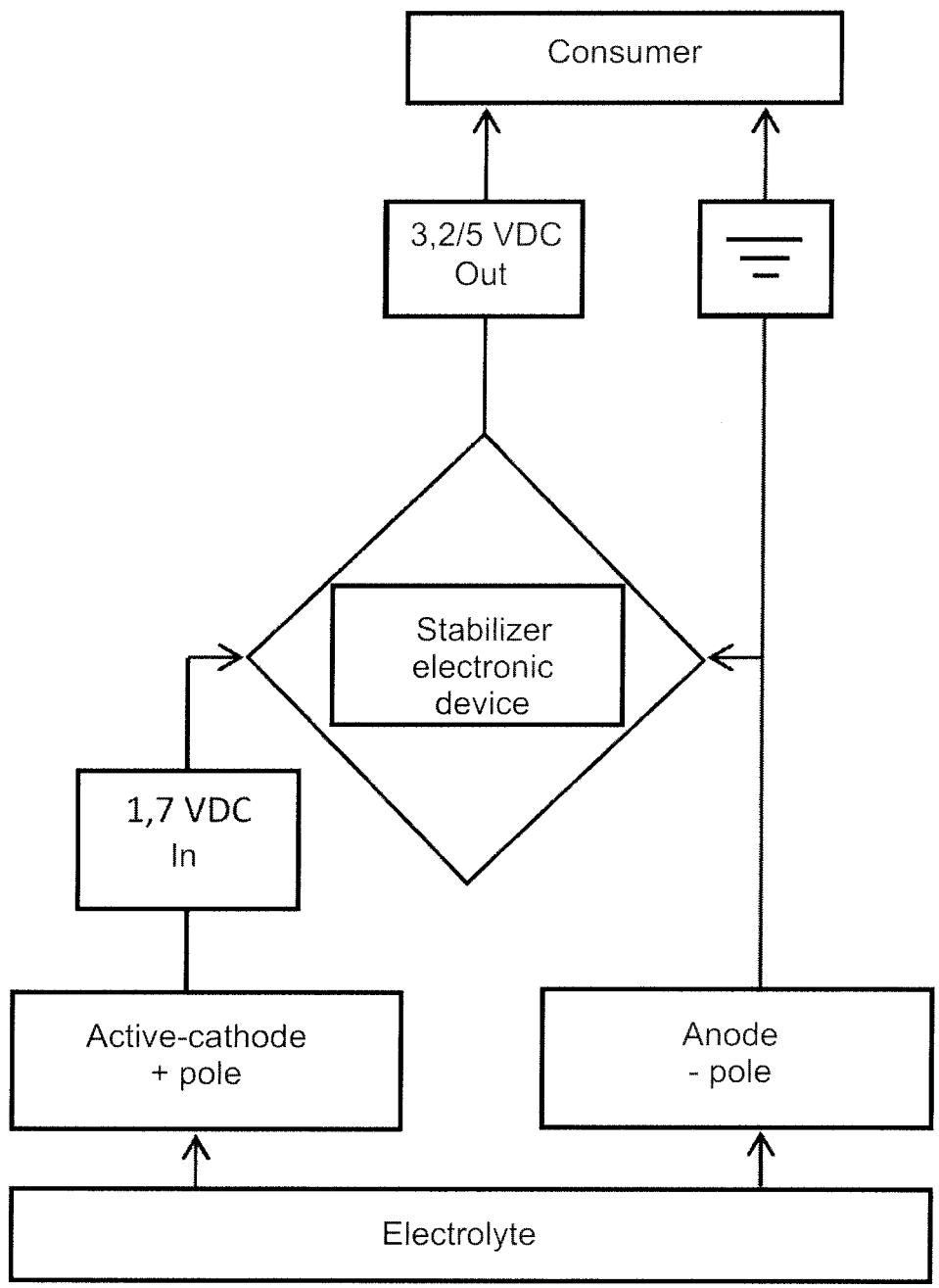
FIG. 11 shows a schematic block diagram of an embodiment of the cathode arrangement according to the invention comprising a stabilizer electronic device.

The embodiment wherein the energy cell comprises a stabilizer electronic device only (i.e. it is not supplied with the isolator converter to be described below) is capable of supplying energy to lower-power utilization circuits (such as LEDs, lamps, battery chargers, distress signal devices, maritime life saving equipment, etc.) The schematic block diagram (functional block diagram) of such an embodiment is shown in FIG. 11 (the voltage output to the utilization circuit is 3.2 V or 5 V).

The isolator converter applied in the energy cell according to the invention in certain embodiments is adapted for providing so-called 'ground independent' isolation and, if necessary, voltage step-up, for the cathode arrangement according to the invention. The application of the isolator converter allows the series and parallel connection of the energy cells made with the cathode arrangement according to the invention, by which it is possible to produce an arbitrary voltage and current output.

As it was mentioned above, the cells of liquid-electrolyte battery systems (acidic, alkaline, seawater) are usually physically separated. Thus, it is possible to connect their cells in series or parallel connection.

Due to the expedient field of application of the cathode arrangement (+ pole) according to the invention the energy cell is preferably in a constant, direct contact with seawater, and thereby it is not possible to physically isolate the individual cells from one another. Applying an isolator converter, however, multiple cathode arrangements according to the invention can be arranged in a single system with the application of a common electrolyte and anode (− pole).

The isolator converter is a current limit regulated circuit designed to match the power of the cathode arrangement according to the invention, comprising a single-phase AC-AC magnetic flux separator (MF) micro-transformer coil.

In the illustrated embodiment the isolator converter performs three major functions when it is connected to the individual energy cells:

a. Galvanic isolation of the individual energy cells,
b. Providing series connection up to 1000 VDC,
c. Voltage step-up to 5 VDC and 12 VDC.

Figure 14:
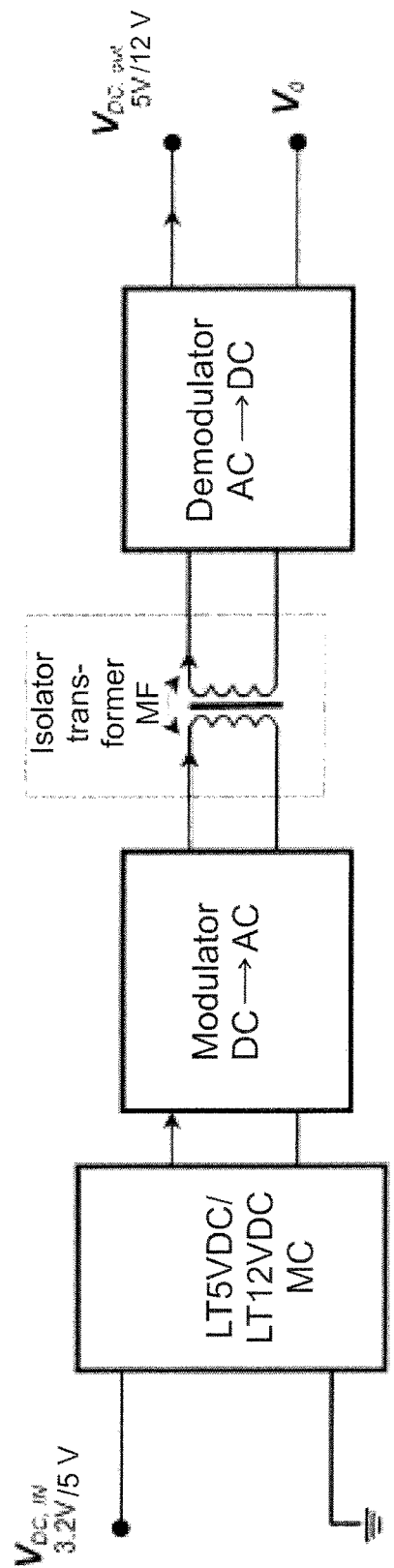
FIG. 14 is a circuit block diagram of the isolator converter.

In the embodiment illustrated in FIG. 14 at the first stage of the isolator converter the input voltage is elevated by a voltage step-up unit—by e.g. a regulator microchip (MC) of the type LT5 VDC or LTI2 VDC (where LT refers to 'Linear Technology'), followed by the direct current (DC) being transformed into alternating current (AC) by a modulator. Alternating current is fed to the primary side of the micro-transformer coil. At the secondary side of the micro-transformer coil, such alternated current is produced that is galvanically isolated from the primary side, the alternating current being transformed again into direct current by a demodulator. In this embodiment the micro-transformer coil has been dimensioned for a breakdown voltage of 1500 VDC, and thus, conforming to the safety regulations it can be used up to an operational voltage level of 1000 VDC.

In an embodiment of the energy cell according to the invention, therefore, an isolator converter, comprising—connected one after the other from the input to the output—a voltage step-up unit, a DC to AC modulator, a transformer, and an AC to DC demodulator, is connected to the stabilized-voltage output of the stabilizer electronic device, and to the anode.

By way of example, the energy cell according to the invention can be applied with isolator converters having a respective output voltage of 5 V and 12 V.

Table 6 below includes the specifications of these two isolator converter units.

TABLE 6

| | 5 V | | 12 V | |
| --- | --- | --- | --- | --- |
| Specifications | Min. | Max. | Min. | Max. |
| Input voltage | 2.97 V | 3.63 V | 4.5 V | 5.5 V |
| Output voltage | — | 5 V | — | 12 V |
| Output current | — | 0.4 A | — | 0.167 A |
| Power | — | 2 W | — | 2 W |
| Efficiency | — | 79% | — | 87% |

Figure 13:
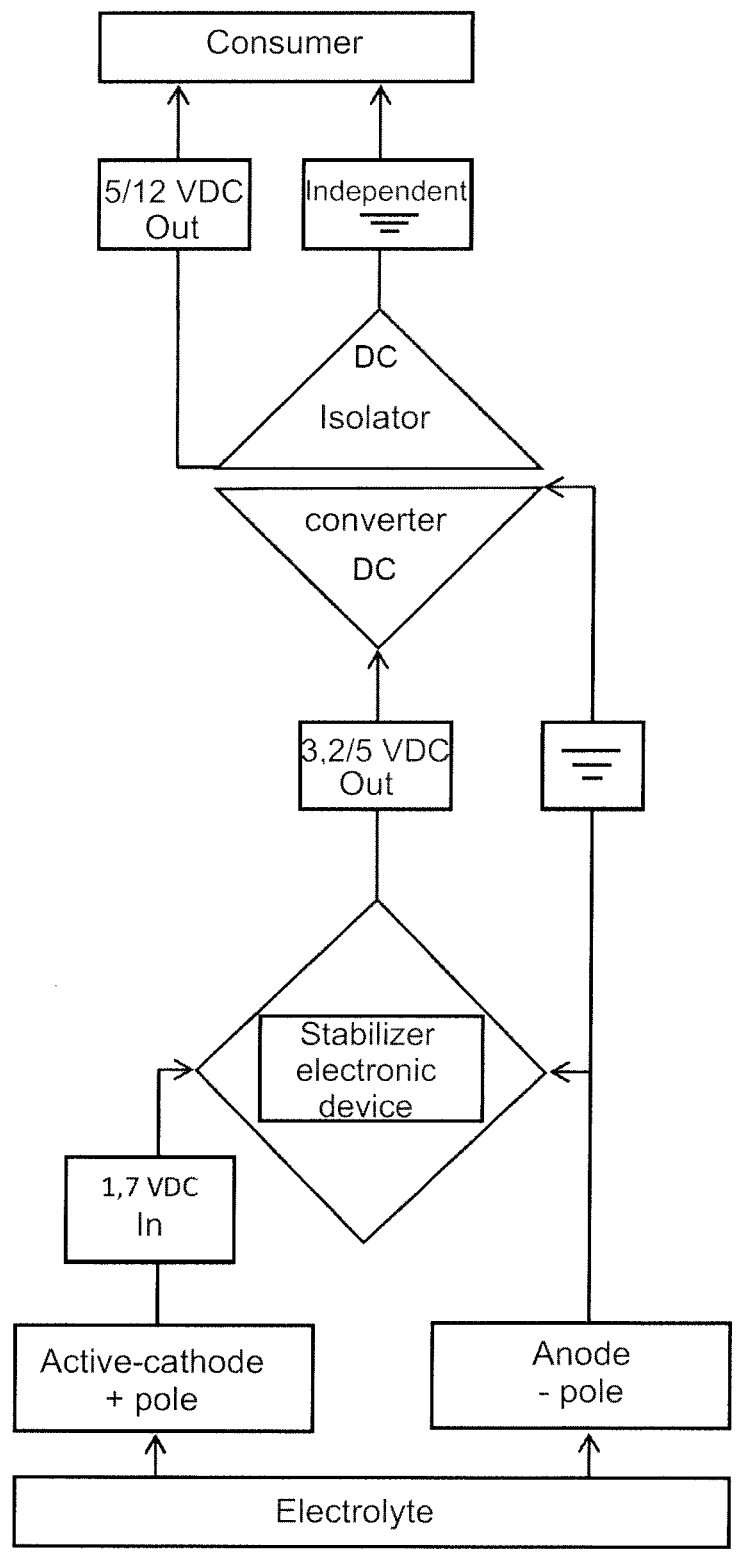
FIG. 13 shows a schematic block diagram of an embodiment of the cathode arrangement according to the invention comprising a stabilizer electronic device and an isolator converter.

The energy cell according to the invention comprising a control electronic device comprising the isolator converter described above is suitable for directly generating readily available, high-voltage and high-current electricity from seawater (provided that multiple such units are connected together). Accordingly, applying multiple interconnected energy cells according to the invention electric power can be supplied to high power-demand electric equipment (e.g. electric boats, robotic explorers, sea buoys, onshore lights). Such an embodiment is illustrated in FIG. 13.

The energy cell according to the invention comprising a control electronic device comprising the isolator converter described above is suitable for directly generating readily available, high-voltage and high-current electricity from seawater (provided that multiple such units are connected together). An important characteristics of this embodiment is that it supplies electric energy only when it is in contact with the electrolyte.

Figure 15:
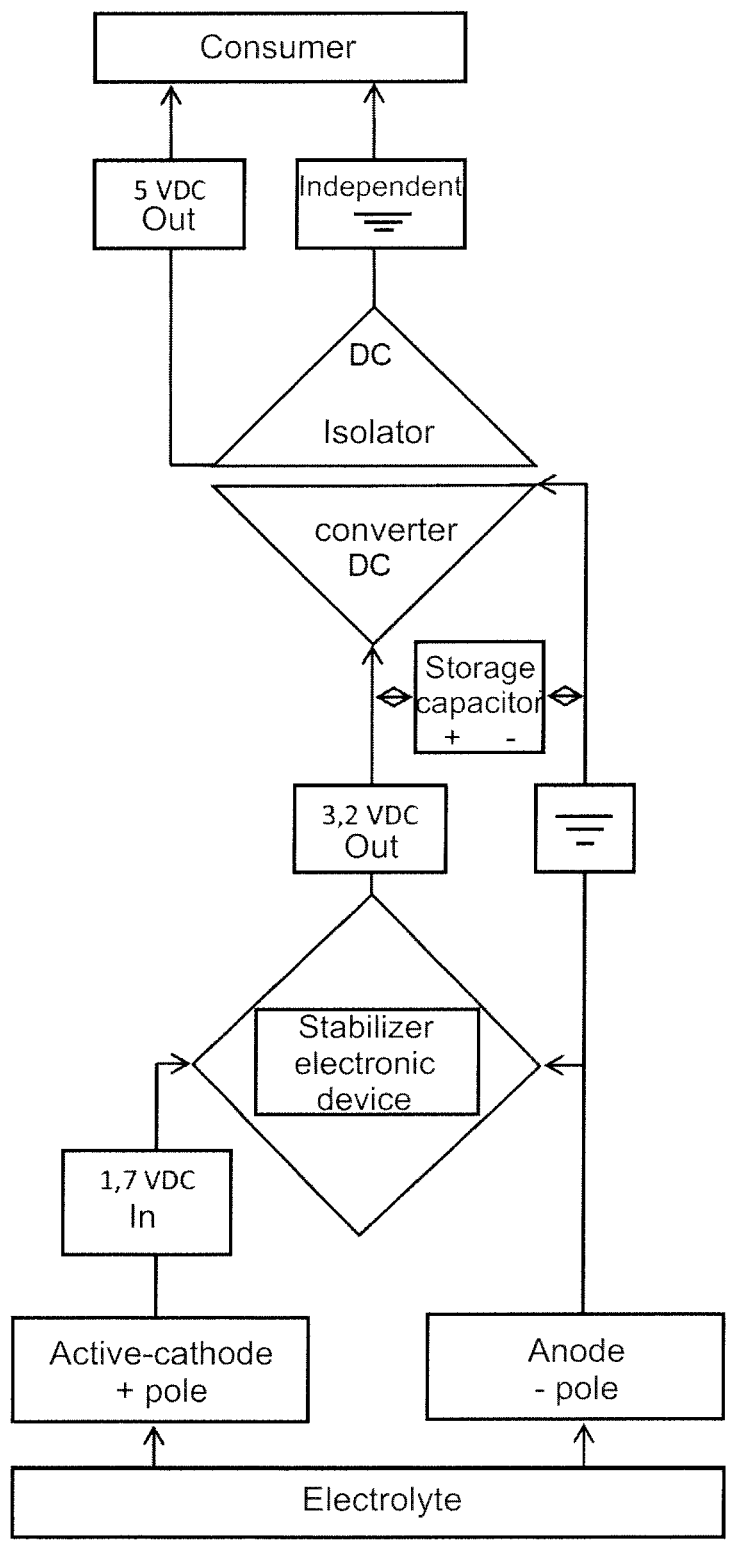
FIG. 15 is a schematic block diagram illustrating a yet further embodiment of the cathode arrangement comprising stabilizer electronic device and an isolator converter.

In the embodiment illustrated in FIG. 15, by integrating a storage capacitor unit in the control electronic device such an embodiment is obtained which is capable of operation without an electrolyte, and, for a short duration, also of outputting a power that exceeds the power output of the energy cell according to the invention. The maximum duration of operation is determined by the capacitance of the storage capacitor unit and the power demand of the utilization circuit. In an embodiment of the energy cell according to the invention, therefore, a storage capacitor is connected, before the isolator converter, to the output of the stabilizer electronic device providing stabilized voltage, and to the anode.

In this embodiment the energy cell according to the invention can be operated as a battery charger. In case the energy cell according to this embodiment is submerged into an electrolyte in a switched-off state, the cathode arrangement continues to operate, charging the storage capacitor with the produced electric energy.

The energy cell according to this embodiment is capable of supplying electric power to high power-demand electric equipment (e.g. electric boats, robotic explorers, sea buoys, onshore lights, as well as lamps and spotlights capable of both onshore and underwater operation).

Certain embodiments of the invention relate to an arrangement for processing hydrogen gas. The arrangement for processing hydrogen gas according to the invention comprises a hydrogen fuel cell adapted for generating current, an embodiment of the energy cell according to the invention, and a hydrogen-transmitting element adapted for transmitting the hydrogen gas generated during the operation of the energy cell using electrolyte to the hydrogen fuel cell. By way of example—as in the case of the embodiment explained below—the hydrogen-transmitting element is a pipe conduit. The generated hydrogen gas is preferably separated from the electrolyte; this can be achieved in a particularly preferable manner in case a pressurized electrolyte exchange system is applied.

During the generation of electric energy, a significant amount of hydrogen ($H_2$) is generated over the surface of the active cathode and anode that constitute the energy cell. The application of a pressurized electrolyte exchange system allows for the utilization of the generated hydrogen in an arrangement for processing hydrogen gas in a particularly preferred manner. An embodiment of the arrangement for processing hydrogen gas is illustrated in FIG. 16.

It has been confirmed by our measurements that hydrogen, produced as a by-product, can be harnessed and transformed into electric energy applying an appropriate process.

The tests and measurements confirmed that an additional amount of electric energy equalling up to 10-30% of the output power of the given active-cathode energy cell can be generated by harnessing the hydrogen by-product.

This means that by harnessing the hydrogen produced during the operation of an active-cathode energy cell system having an output power of 1000 W an additional 100-300 W of electric power can be generated.

An embodiment of the arrangement for processing hydrogen gas is described in relation to FIG. 16. From a container 100 the electrolyte is fed to an energy cell housing 110 (which is an embodiment of the energy cell according to the invention) through a pipe conduit network 102. In the case of the application of a pressurized electrolyte exchange system, hydrogen leaving the housing holding the energy cells through an outlet port together with the electrolyte is fed to the outlet part of the pipe conduit network 102. A pressurizing valve 108, adapted for ensuring the constant pressure (produced by a pump 104) required for the system's operation, is situated in this pipe network. In this embodiment, a particle filter 112 is arranged in the portion of the pipe conduit network 102 returning to the container 100, downstream of the pressurizing valve 108.

A preferably mesh-type gas separator 106 is arranged in the pipe conduit section between the pressurizing valve 108 and the energy cell housing 110. Since the gas separator 106 is built into the system upstream of the pressurizing valve 108, the partial pressure of the separated hydrogen gas (usually approximately 1-3 bar) is the same as the operating pressure of the pressurized electrolyte exchange system.

Hydrogen is transmitted from the gas separator 106 through a gas dryer unit 114 into a container 116 adapted for hydrogen storage that preferably comprises a medium-pressure valve and a pressure control valve.

The hydrogen fuel cell 118 is adapted for utilizing the generated hydrogen. By way of example, the fuel cell can be a commercially available PEM—(Proton Exchange Membrane) type hydrogen-air fuel cell system.

The specifications of the PEM fuel cell are the following:
Cell voltage: 12 VDC
Reagents: Hydrogen—Air
Operating temperature: 5-35° C.
Max. internal temperature: 65° C.
Required $H_2$ pressure: 0.55-0.7 Bar
Hydrogen quality: 99 weight % pure, dry $H_2$ An air compressor 120, adapted for introducing compressed air, is connected to the hydrogen fuel cell 118. Hydrogen is fed into the hydrogen fuel cell at one side, compressed air being introduced therein at the other side. One side of the PEM membrane is in contact with hydrogen, and the other side is in contact with the air. The membrane separates the oxygen from the air. In the presence of the two gases, electric current is induced during the reaction taking place in the PEM membrane. As a by-product, water is produced by the combination of hydrogen and oxygen. The oxygen-comprising gas (air) is provided in the necessary quantity by an air compressor 120 connected to the oxygen side of the hydrogen fuel cell 118, at a pressure equal to the pressure of hydrogen fed into the cell. As shown in FIG. 16, an utilization circuit can be connected both to the housing of the energy cell 110 and to the hydrogen fuel cell 118.

Certain embodiments of the invention cover a use of the energy cell according to the invention, wherein seawater and salt water is applied as electrolyte.

Further embodiments of the invention relate to a manufacturing method of the cathode arrangement according to the invention, comprising the steps of providing, in a cathode housing defining a space for cathode material and comprising a cathode housing wall being permeable to an electrolyte, a collector member made of graphite, having a first end part extending into the space for cathode material and a second end part extending outside the space for cathode material, and arranging cathode particles, having a cylindric shape with a diameter of 2-5 mm and being extruded from carbon, in the space for cathode material. The cathode arrangement is produced by carrying out these steps.

In an embodiment of the method according to the invention the cathode particles are arranged in the space for cathode material in one or more filling stages, and, after the one or more filling stages, the cathode particles contained in the space for cathode material are shaken together.

In another embodiment of the method according to the invention the cathode particles are compacted in the space for cathode material after the steps of the method (i.e. after one or two filling stages, or in the case of shaking together is performed, after that).

According to the above, the method according to the invention may by way of example be carried out such that the empty cathode housing—not comprising any cathode particles—is oriented with its open end (i.e. the end through which the cathode particles can be filled in) up. At this stage, the collector member has preferably been already inserted into the cathode housing. The cathode particles are fed into the cathode housing thus prepared in one or more filling stages (optionally applying shaking between the filling stages). Subsequently, the cathode particles are optionally compacted, and the opening of the cathode housing is closed. In such a case—provided that the collector member is made of a sufficiently strong material, by way of example, pressed graphite—no problem is posed by installing the collector member before the compaction process, as it has sufficient strength to withstand compaction without being damaged.

The energy cell according to the invention is rendered capable of maritime or deep-sea long-time applications by its constituent parts. The most important requirements and the solutions given for them are as follows:
 a) Achieving the highest possibly and stably achievable electrode potential
  i) Determining the appropriate precursor for the material of the activated carbon electrode.
  ii) The precursor preferably applied according to the invention is constituted by the hard-shell seeds of fruits.
  iii) Utilizing other carbon, graphite, and activated carbon with the same magnesium anodes, with the application of a seawater electrolyte of the same salinity the achievable electrode potential measured in our tests varied between 1V and 1.5V. In most cases stability has not proven to be sufficient.
  iv) With the cathode arrangement according to the invention, under the same conditions as above, the measured electrode potential was stable at 1.7V.
 b. Achieving adequate depolarization
  v) The geometric configuration of the cathode material provides for the formation of appropriately sized passages that are sufficiently large for the continuous movement of electrolyte and for the separation and removal of hydrogen micro-bubbles produced during the chemical reaction.
 c. Isolation of cells
  vi) The single greatest drawback of all energy cells applying seawater or salt water is the low achievable electrode potential.
  vii) In the known approaches another great disadvantage is posed by the application of a common electrolyte and a common anode because it impedes the series connection of the cells that would be required for achieving higher voltage levels. Series connection is only possible by isolating the individual cells from one another.
  viii) Cell isolation can be performed utilizing an isolator converter circuit, for which a minimal stable voltage of 3.2V is required.
  ix) In order to step up the 1.7V voltage of the active cathode to a voltage level of 3.2V and to stabilize the voltage a stabilizer electronic device has been included.
  x) By the combined application of these two electronic circuits isolation can be provided for all active cathode cells as required for generating industrial-type power levels.

Figure 17A:
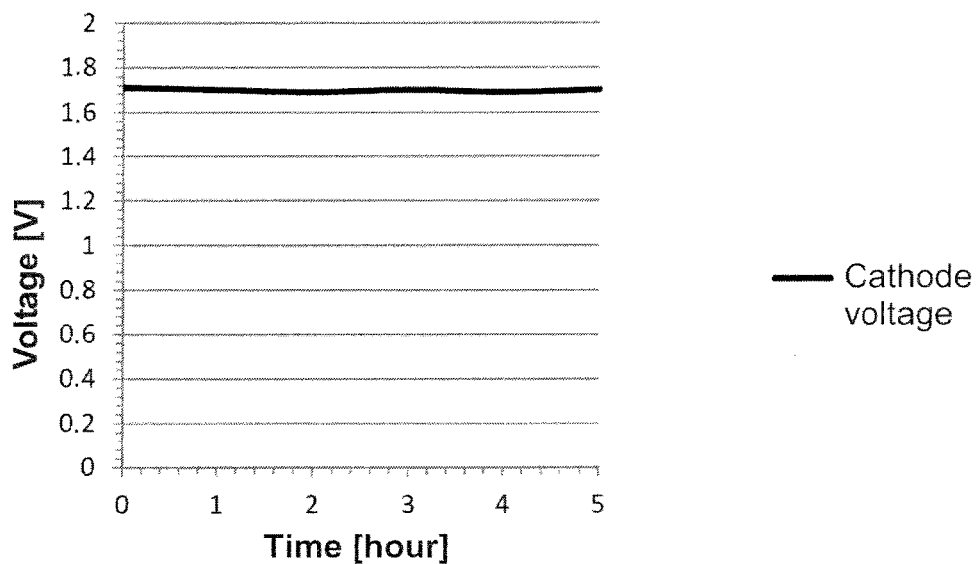
FIGS. 17A and 17B are graphs showing the anode voltage as a function of time.
Figure 17B:
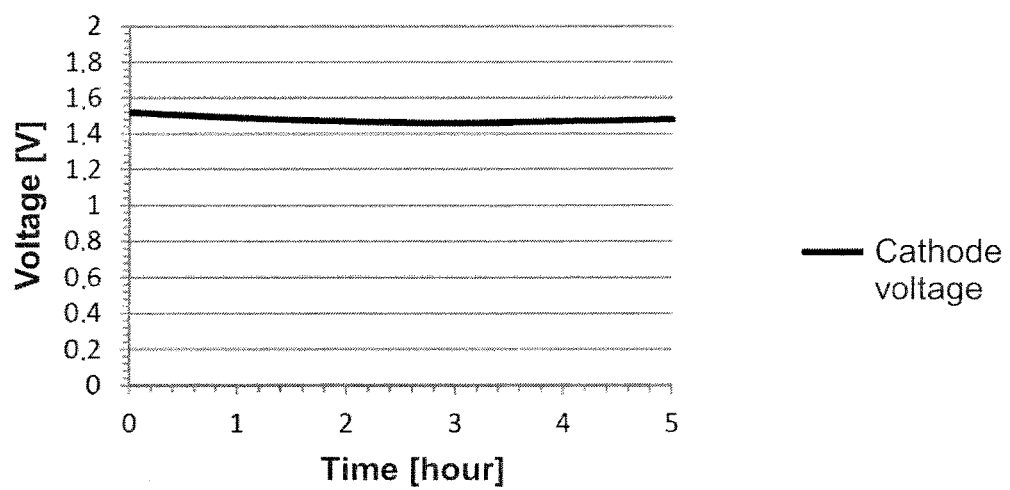

In another measurement the electrode potentials of the cathode arrangement according to the invention and of the AZ63 anode were tested. The specifications of the cathode arrangement applied for this measurement are the following:
Number of cathode housings: 1
Volume of cathode housing (a cathode housing with the dimensions specified
above was utilized in these measurements, too): 63 cm$^3$
Density of cathode material: 0.344 g/cm$^3$
Temperature: 23° C.
Electrolyte: 3.5 weight % saline aqueous solution
Electrolyte temperature: 20° C.
Measurement duration: 5 hours
Load: 500 mA
Energy density: 0.0119 W/cm$^3$
Output voltage: 1.71 V The results of these measurements are illustrated without load and with a load of 500 mA in FIG. 17A and FIG. 17B, respectively. As shown in the figures, the output voltage is slightly reduced with a load.

The invention is, of course, not limited to the preferred embodiments described in details above, but further variants, modifications and developments are possible within the scope of protection determined by the claims.

The invention claimed is:

1. A cathode arrangement comprising:
 a cathode housing defining a space for cathode material and comprising a cathode housing wall being permeable to an electrolyte, and
 a collector member made of carbon, having a first end part extending into the space for cathode material and a second end part extending outside the space for cathode material,
 characterised in that cathode particles, having a cylindric shape with a diameter of 2-5 mm and being extruded from carbon, are arranged in the space for cathode material.

2. The cathode arrangement according to claim 1, characterised in that the diameter of the cathode particles is between 3 mm and 4 mm.

3. The cathode arrangement according to claim 1, characterised in that the cathode particles are arranged in the space for cathode material as compacted.

4. The cathode arrangement according to claim 1, characterised in that the cathode particles have a diameter-length ratio of 1:1-1:3.

5. The cathode arrangement according to claim 1, characterised in that the second end part of the collector member
- is arranged to extend into a control housing, said control housing is connected to the cathode housing and comprises a control electronic device, and
- is provided with a silver coating.

6. The cathode arrangement according to claim 5, characterised in that a pressure-retaining insulation, at least partly surrounding the second end part of the collector member, is arranged to fit to the outside surface of the cathode housing.

7. The cathode arrangement according to claim 6, characterised in that the pressure-retaining insulation is arranged to completely fill the control housing.

8. The cathode arrangement according to claim 1, characterised in that the collector member is manufactured by pressing from high-purity graphite.

9. The cathode arrangement according to claim 1, characterised in that the collector member is a collector rod, the cathode housing has a cylindrical shape, and the collector rod is arranged along the axis of symmetry of the cathode housing.

10. The cathode arrangement according to claim 1, characterised in that a separator filter is arranged on that cathode housing wall which is permeable to the electrolyte.

11. The cathode arrangement according to claim 1, characterised in that the carbon precursor utilized for extruding the cathode particles is from hard-shell fruits or from hard-shell seeds of fruits.

12. An energy cell comprising an anode, characterised by comprising the cathode arrangement according to claim 1.

13. The energy cell according to claim 12, characterised by comprising a stabilizer electronic device adapted for stabilizing the output voltage of the energy cell, the stabilizer electronic device being connected to the second end part of the collector member and to the anode, comprising a voltage step-up circuit series-connected to an oscillator coil, having, at its output, a resistor divider and a rectifier element adapted for protection against back-current.

14. The energy cell according to claim 13, characterised in that an isolator converter, comprising:
- connected one after the other from the input to the output;
- a voltage step-up unit, a DC to AC modulator, a transformer, and an AC to DC demodulator, is connected to the output of the stabilizer electronic device providing stabilized output voltage, and to the anode.

15. The energy cell according to claim 14, characterised in that a storage capacitor is connected, before the isolator converter, to the output of the stabilizer electronic device providing stabilized voltage, and to the anode.

16. An arrangement for processing hydrogen gas comprising a hydrogen fuel cell adapted for generating current, characterised by further comprising
- the energy cell according to claim 12, and
- a hydrogen-transmitting element adapted for transmitting hydrogen gas generated during the operation of the energy cell using electrolyte to the hydrogen fuel cell.

17. A method for manufacturing a cathode arrangement, comprising the steps of providing, in a cathode housing defining a space for cathode material and comprising a cathode housing wall being permeable to an electrolyte, a collector member made of carbon, having a first end part extending into the space for cathode material and a second end part extending outside the space for cathode material,
- characterised by arranging cathode particles, having a cylindric shape with a diameter of 2-5 mm and being extruded from carbon, in the space for cathode material.

18. The method according to claim 17, characterised in that the cathode particles are arranged in the space for cathode material in one or more filling stages, and, after the one or more filling stages, the cathode particles being in the space for cathode material are shaken together.

19. The method according to claim 17, characterised in that, after the steps of the method, the cathode particles are compacted in the space for cathode material.

* * * * *